US012701209B2

(12) United States Patent
Lee et al.

(10) Patent No.: US 12,701,209 B2
(45) Date of Patent: Aug. 4, 2026

(54) PHOTOREALISTIC 4D SCENE GENERATION USING VIDEO DIFFUSION MODELS

(71) Applicant: Snap Inc., Santa Monica, CA (US)

(72) Inventors: Hsin-Ying Lee, San Jose, CA (US);
Willi Menapace, Los Angeles, CA
(US); Aliaksandr Siarohin, Santa
Monica, CA (US); Sergey Tulyakov,
Santa Monica, CA (US); **Chaoyang
Wang, Los Angeles, CA (US); Heng
Yu, Los Angeles, CA (US); Peiye
Zhuang**, Culver City, CA (US)

(73) Assignee: Snap Inc., Santa Monica, CA (US)

( * ) Notice: Subject to any disclaimer, the term of this
patent is extended or adjusted under 35
U.S.C. 154(b) by 135 days.

(21) Appl. No.: 18/893,343

(22) Filed: Sep. 23, 2024

(65) Prior Publication Data
US 2026/0089303 A1     Mar. 26, 2026

(51) Int. Cl.
| | |
|---|---|
| *H04N 13/279* | (2018.01) |
| *G06T 17/00* | (2006.01) |
| *H04N 13/282* | (2018.01) |
| *H04N 21/81* | (2011.01) |

(52) U.S. Cl.
CPC .......... *H04N 13/279* (2018.05); *G06T 17/00*
(2013.01); *H04N 13/282* (2018.05); *H04N
21/816* (2013.01)

(58) Field of Classification Search
None
See application file for complete search history.

(56) References Cited

U.S. PATENT DOCUMENTS

2025/0182404 A1 * 6/2025 Kreis ..................... G06T 17/00

OTHER PUBLICATIONS

Bahmani, Sherwin, et al., "4D-fy: Text-to-4D Generation Using
Hybrid Score Distillation Sampling", arXiv:2311.17984v2 [cs.CV],
(May 26, 2024), 15 pgs.
Cao, Junli, et al., "Lightweight Predictive 3D Gaussian Splats",
arXiv:2406.19434v1 [cs.GR], (Jun. 27, 2024), 12 pgs.
Ling, Huan, et al., "Align Your Gaussians: Text-to-4D with Dynamic
3D Gaussians and Composed Diffusion Models", arXiv:2312.
13763v2 [cs.CV], (Jan. 3, 2024), 39 pgs.

(Continued)

*Primary Examiner* — Frank S Chen
(74) *Attorney, Agent, or Firm* — Schwegman Lundberg &
Woessner, P.A.

(57) ABSTRACT

A method for generating photorealistic 4D scenes from text
inputs is disclosed. The method utilizes a text-to-video
diffusion model to generate a reference video and a freeze-
time video. A canonical 3D representation is reconstructed
using deformable 3D Gaussian Splats (D-3DGS) based on
the freeze-time video. Temporal deformations are learned to
capture dynamic interactions in the reference video. The
method employs a novel Score Distillation Sampling strat-
egy combining multi-view and temporal aspects to enhance
consistency and robustness. The resulting 4D scenes feature
multiple objects interacting with detailed background envi-
ronments, viewable from different angles and times. The
method enables flexible camera control and integration with
augmented and virtual reality applications. Some examples
include features such as image-to-4D generation.

20 Claims, 19 Drawing Sheets

(56)                 References Cited

OTHER PUBLICATIONS

Luiten, Jonathon, et al., "Dynamic 3D Gaussians: Tracking by Persistent Dynamic View Synthesis", arXiv:2308.09713v1 [cs.CV], (Aug. 18, 2023), 11 pgs.

Menapace, Willi, et al., "Snap Video: Scaled Spatiotemporal Transformers for Text-to-Video Synthesis", arXiv:2402.14797v1 [cs. CV], (Feb. 22, 2024), 25 pgs.

Yu, Heng, et al., "4Real: Towards Photorealistic 4D Scene Generation via Video Diffusion Models", arXiv:2406.07472v1 [cs.CV], (Jun. 11, 2024), 18 pgs.

Zheng, Yufeng, et al., "A Unified Approach for Text- and Image-guided 4D Scene Generation", arXiv:2311.16854v3 [cs.CV], (11 pgs), May 7, 2024.

* cited by examiner

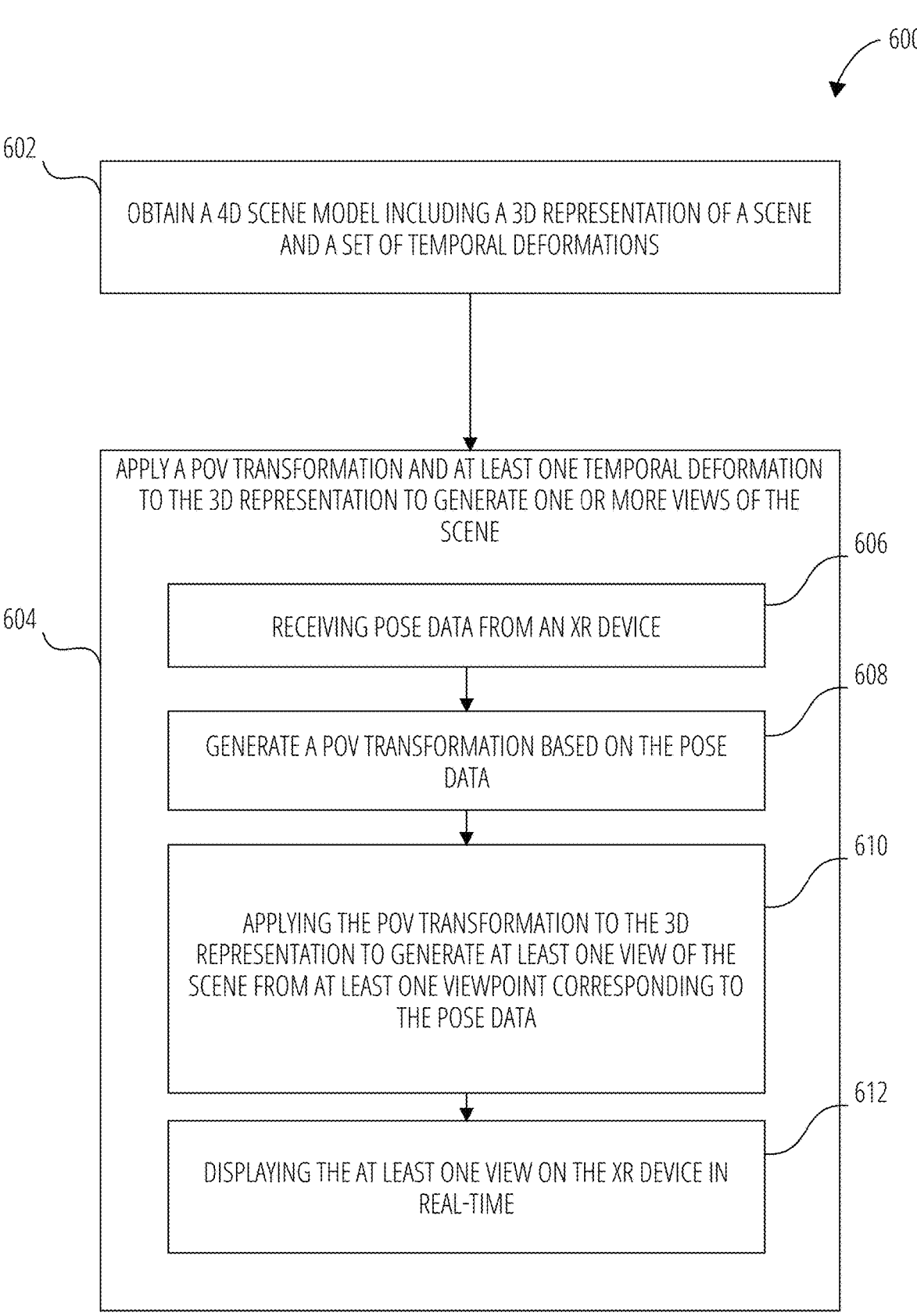

600

602
OBTAIN A 4D SCENE MODEL INCLUDING A 3D REPRESENTATION OF A SCENE AND A SET OF TEMPORAL DEFORMATIONS

604
APPLY A POV TRANSFORMATION AND AT LEAST ONE TEMPORAL DEFORMATION TO THE 3D REPRESENTATION TO GENERATE ONE OR MORE VIEWS OF THE SCENE

606
RECEIVING POSE DATA FROM AN XR DEVICE

608
GENERATE A POV TRANSFORMATION BASED ON THE POSE DATA

610
APPLYING THE POV TRANSFORMATION TO THE 3D REPRESENTATION TO GENERATE AT LEAST ONE VIEW OF THE SCENE FROM AT LEAST ONE VIEWPOINT CORRESPONDING TO THE POSE DATA

612
DISPLAYING THE AT LEAST ONE VIEW ON THE XR DEVICE IN REAL-TIME

FIG. 6

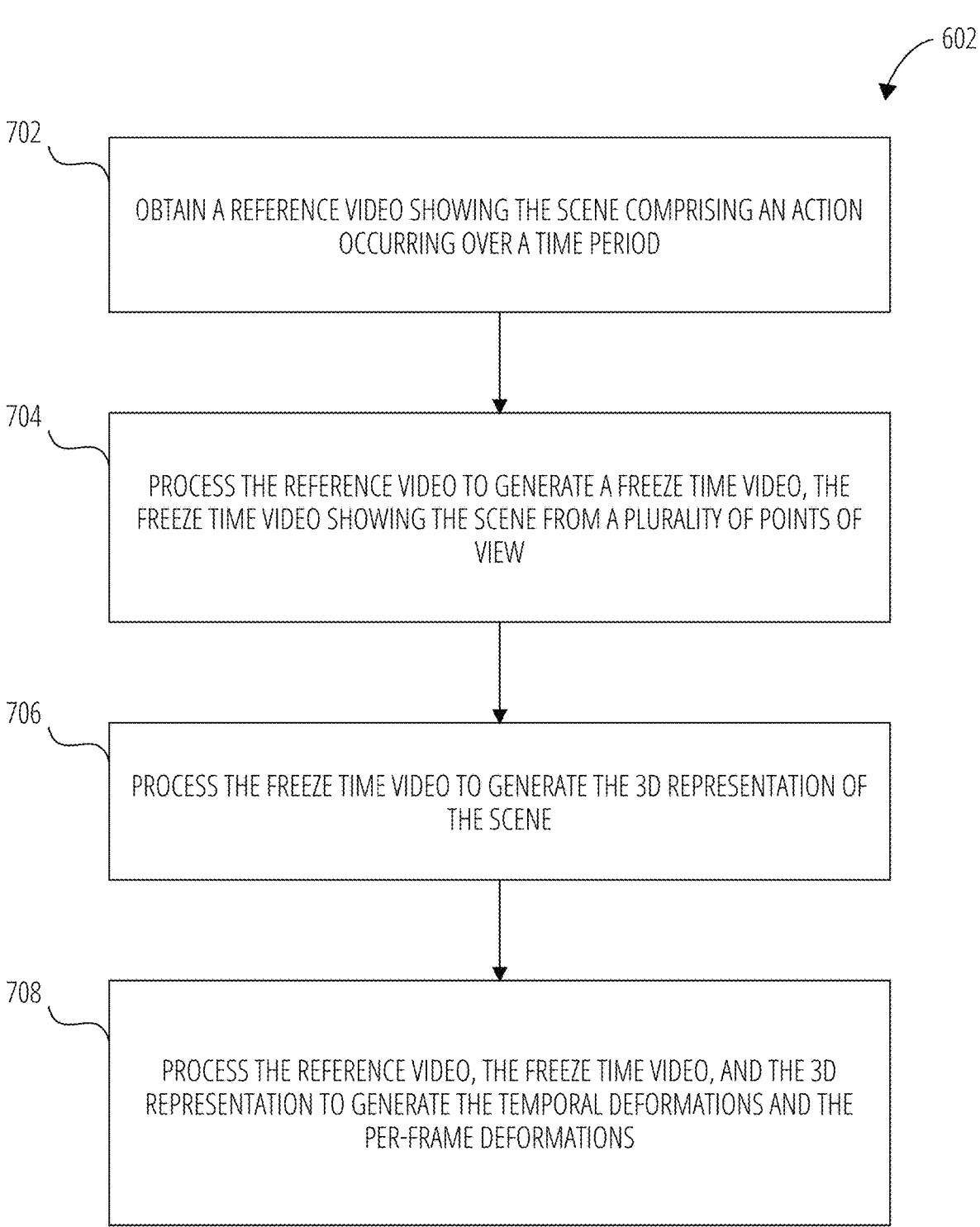

702     OBTAIN A REFERENCE VIDEO SHOWING THE SCENE COMPRISING AN ACTION OCCURRING OVER A TIME PERIOD

704     PROCESS THE REFERENCE VIDEO TO GENERATE A FREEZE TIME VIDEO, THE FREEZE TIME VIDEO SHOWING THE SCENE FROM A PLURALITY OF POINTS OF VIEW

706     PROCESS THE FREEZE TIME VIDEO TO GENERATE THE 3D REPRESENTATION OF THE SCENE

708     PROCESS THE REFERENCE VIDEO, THE FREEZE TIME VIDEO, AND THE 3D REPRESENTATION TO GENERATE THE TEMPORAL DEFORMATIONS AND THE PER-FRAME DEFORMATIONS

FIG. 7

PHOTOREALISTIC 4D SCENE GENERATION USING VIDEO DIFFUSION MODELS

TECHNICAL FIELD

The present disclosure relates generally to generative artificial intelligence and more particularly to photorealistic four-dimensional scene generation using video diffusion models.

BACKGROUND

Artificial Intelligence (AI) has made significant strides in recent years, particularly in the domains of computer vision and natural language processing. Machine learning techniques, such as deep learning and neural networks, have enabled AI systems to process and generate complex visual and textual data with increasing sophistication. In the realm of video generation, diffusion models can be used to create high-quality, diverse content from text or image inputs. These models work by gradually denoising random noise to produce coherent video frames, guided by the input prompt. Transformer architectures, originally developed for natural language tasks, have been adapted for video generation, potentially offering improved quality, scalability, and/or training efficiency.

Extended Reality (XR) technologies, encompassing Virtual Reality (VR), Augmented Reality (AR), and Mixed Reality (MR), provide immersive and interactive experiences. These technologies rely on 3D rendering techniques to create convincing virtual environments or overlay virtual content onto the real world. The development of lightweight, high-resolution displays and advanced motion tracking systems have the potential to further improve user experience in XR applications.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. Some non-limiting examples are illustrated in the figures of the accompanying drawings in which:

FIG. 6 is a flowchart showing operations of a method for generating views of a scene, according to some examples.

FIG. 7 is a flowchart showing an example of obtaining the 4D scene model of the method of FIG. 6, according to some examples.

DETAILED DESCRIPTION

Figure 1:
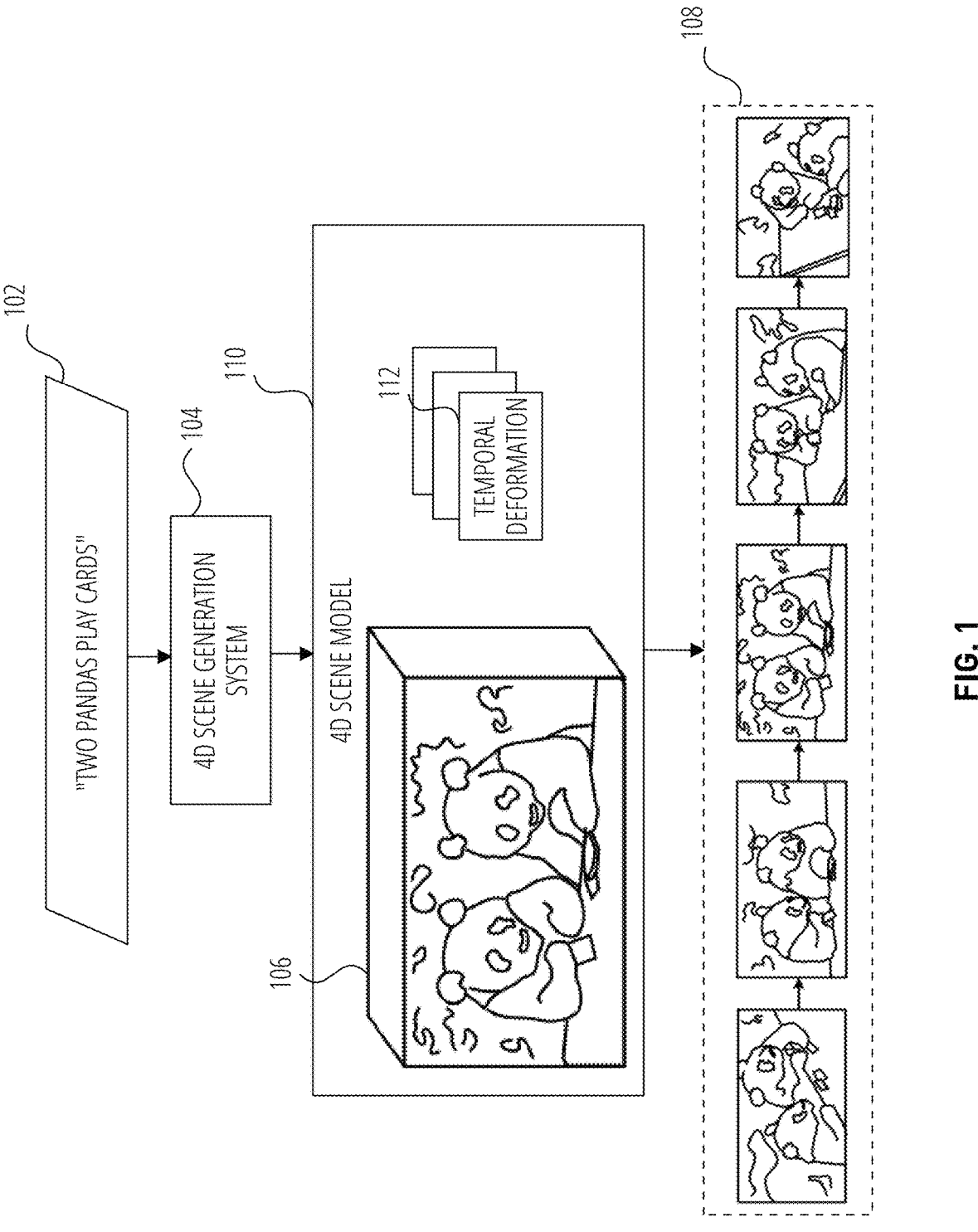
FIG. 1 is a schematic diagram of a 4D scene generation system for generating views of a scene, according to some examples.

The emergence of generative AI models trained to generate video provides the potential for artists and other users to create detailed video content based on input prompts, such as textual and/or image-based prompts. However, the ability of users to specify multiple views of a 3D scene in which dynamic action is occurring (also referred to as a 4D scene, in which the scene changes along the fourth dimension of time) is limited by existing approaches to generative video, which are typically limited to 3D views of visually simplified, non-photorealistic objects against blank backgrounds.

In the realm of interactive 3D applications, such as XR, the tools available to create dynamic, photorealistic 4D content are also limited. Creating photorealistic, dynamic content for interactive 3D platforms remains a significant challenge, often requiring extensive manual effort or relying on pre-existing 3D assets.

The integration of AI-driven content generation with XR technologies presents an opportunity to overcome these limitations, potentially enabling more diverse, responsive, and realistic XR experiences, as well as enabling greater control over generated video content.

Examples described herein provide systems, methods, and computer readable media for generating views of 4D scenes, including photorealistic 4D scenes, from inputs such as text or image data. Some examples utilize a video generation model to produce a reference video and a freeze-time video, which are then used to reconstruct a 4D representation of the scene. The process begins with a text or image prompt that is fed into a diffusion model trained to generate videos. The resulting reference video captures the desired dynamic scene, including moving objects and their interactions with the environment. A freeze-time video is then generated based on a selected frame from the reference video, using prompt engineering techniques to create a video with substantial camera motion while maintaining a relatively static scene.

In some examples, the 4D scene reconstruction process involves several steps. First, a canonical 3D Gaussian Splats (3DGS) representation is created from the freeze-time video. This 3D representation serves as the foundation for the 4D scene and consists of a set of 3D Gaussian points, each associated with position, opacity, color, orientation, and scaling parameters. To handle inconsistencies in the freeze-time video, per-frame deformations are learned jointly with the canonical 3DGS. Temporal deformations are then learned to align the 3DGS with the reference video, capturing dynamic interactions in the scene. Throughout the reconstruction process, various loss functions are applied, including image reconstruction loss, small motion loss, and Score Distillation Sampling (SDS) loss, to optimize the 3DGS representation and ensure high-quality, consistent results.

Some examples described herein can address one or more technical problems presented by existing approaches to 4D scene generation. By utilizing video generation models trained on diverse real-world datasets, some examples can produce more photorealistic results compared to approaches that rely on synthetic object datasets. The ability to generate scenes with multiple objects interacting with detailed background environments represents a significant improvement over object-centric approaches.

The use of 3D Gaussian Splats in examples described herein as the underlying 3D representation can enable efficient rendering and compatibility with existing graphics pipelines. Furthermore, the incorporation of per-frame deformations can enable described examples to handle imperfections in the generated freeze-time video, potentially resulting in more robust reconstructions. Additionally, the use of Score Distillation Sampling during training can help to ensure consistency and/or plausibility in both multi-view and temporal aspects of the generated scenes. Taken together, the features of various examples described herein can potentially address multiple technical challenges in generating high-quality, dynamic 4D scenes from text or image inputs, potentially enabling more immersive and interactive experiences in various applications such as virtual reality, augmented reality, and content creation.

FIG. 1 is a schematic diagram of a 4D scene generation system 104 for generating views of a scene. The 4D scene generation system 104 receives an input 102, which may be a text input (e.g., the text "two pandas play cards" as shown in the illustrated example), an image input, or another input suitable for being processed by a diffusion model or transformer model to generate a video based on the input 102. The input 102 is processed by a 4D scene generation system 104, which utilizes various components to create a 4D scene model 110 representative of a scene generated based on the input 102. The 4D scene model 110 is capable of generating multiple views of the scene from different points of view and/or at different points in time. In some examples, the scene includes an action taking place over time, such as one or more objects moving or undergoing other visual changes. In some examples, the views of the scene can be photorealistic. In some examples, the views of the scene can include views of an environment in which the action takes place, such as a detailed background, one or more potentially occluding objects, and/or one or more 3D objects that change appearance when viewed from different points of view.

The 4D scene generation system 104 can be used to generate outputs. One of these outputs can be a 3D representation of the scene, shown as a canonical 3D Gaussian Splats (3DGS) representation 106. This 3D representation can be used by other software modules or other devices to perform different tasks related to the generated scene, such as XR-related tasks. These tasks can include displaying interactive views of the scene, showing different points of view of the scene at different points in time, modeling collision of virtual objects with elements of the scene, and so on. Examples of interactive XR tasks using the outputs of the 4D scene model 110 are described below with reference to method 600 of FIG. 6.

The 4D scene model 110 can also generate rendered videos of the scene, such as output video 108, showing the action of the scene over a period of time and/or from multiple points of view. In this example, the output video 108 shows two pandas playing cards at a table while the point of view (also referred to herein as the camera or the camera position, meaning the position of a hypothetical video camera that would be used to shoot a real-world version of the video) pans in a circular motion around them.

The 4D scene model 110 includes the canonical 3DGS representation 106 as well as a set of temporal deformations used in generating outputs. The canonical 3DGS representation 106 serves as a foundation for the 4D scene, representing a static view of the 3D scene at a fixed point in time during the action, also referred to as a canonical frame. The canonical 3DGS representation 106 can be spatially transformed to generate a view of the static scene from an arbitrary point of view (POV). The set of temporal deformations 112 captures the dynamic aspects of the scene, and can be applied to the canonical 3DGS representation 106 to generate views of the scene shifted in time from the canonical frame. The temporal deformations 112 represent how the scene changes over time, enabling the 4D scene model 110 to capture and reproduce dynamic interactions and motions within the scene.

Thus, the 4D scene model 110 can provide a complete 4D representation of the scene, including both static and dynamic elements as seen at multiple points in time and from multiple points of view. In some examples, the first stages of the 4D scene generation system 104 can be provided as a developer tool to software developers, artists, or content creators to enable them to create 4D scene models 110. The latter stages of the 4D scene generation system 104, including one or more 4D scene models 110 generated previously, can be provided to end users (such as end users of an XR device) to present the users with views of 4D scenes, such as interactive XR views of scenes.

The 4D scene generation system 104 can thus be used to generate 4D scenes from inputs, such as text or image inputs. Details of how the 4D scene generation system 104 generates the 4D scene model 110, and how the 4D scene model 110 generates outputs, are addressed in further detail in reference to FIG. 2 through FIG. 8 below. FIG. 9 through FIG. 19 show examples of devices, systems, and software architectures that can be used to operate the 4D scene generation system 104 to generate 4D scene models 110 and/or to use the 4D scene generation system 104 to perform various tasks using the outputs of 4D scene models 110.

Figure 2:
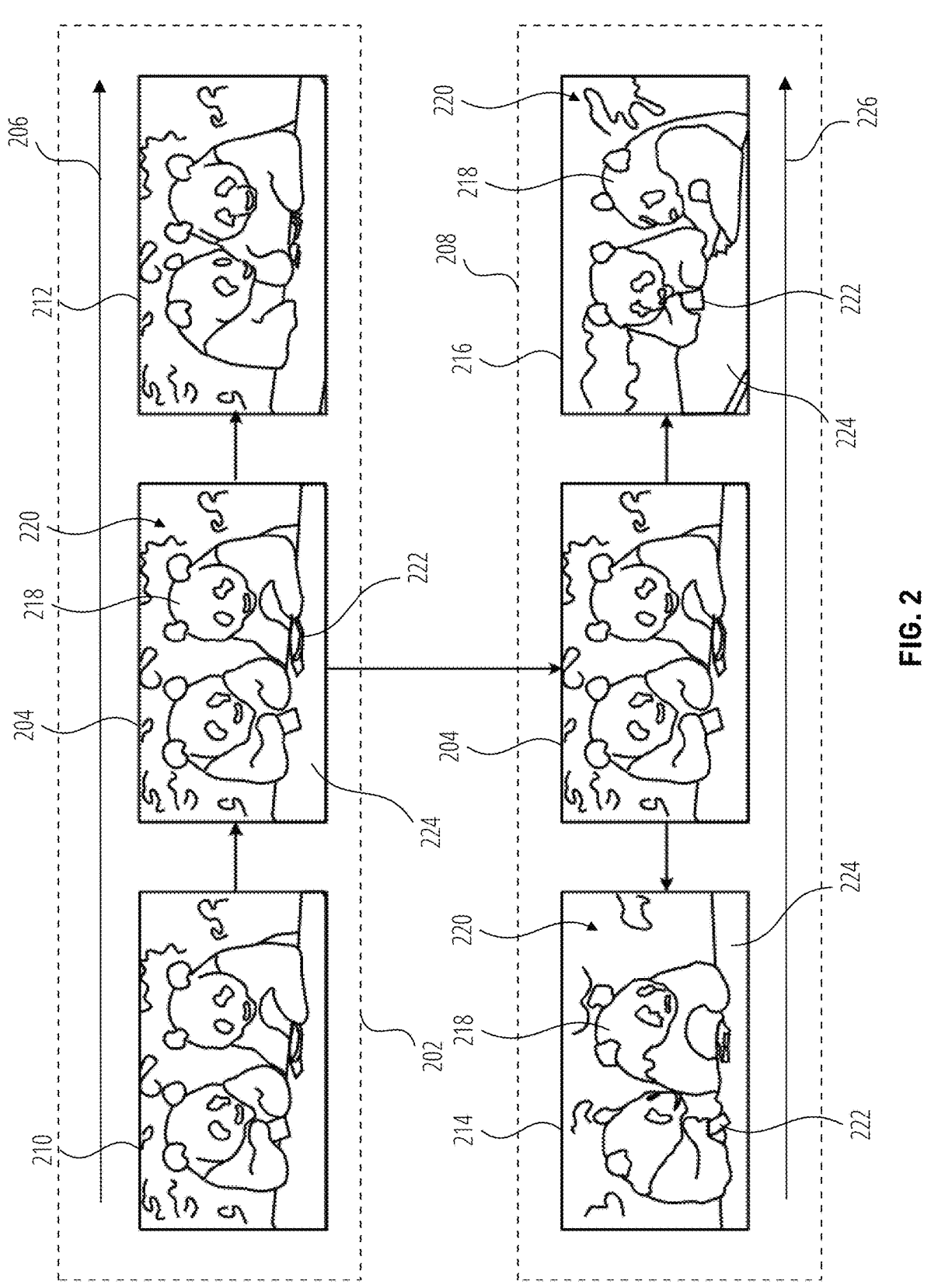
FIG. 2 is a schematic diagram showing generation of a freeze time video from a reference video, according to some examples.

FIG. 2 is a schematic diagram showing generation of a freeze time video 208 from a reference video 202. The example reference video 202 and freeze time video 208 shown in FIG. 2 are used throughout this disclosure as examples of videos capturing temporally dynamic aspects of the scene (in the reference video 202) and static 3D aspects of the scene (in the freeze time video 208). The reference video 202 and freeze time video 208 share a common frame, taken from the reference video 202, and referred to as the reference frame 204 or the canonical frame.

The reference video 202 includes a first sequence of frames (e.g., including prior frame 210, reference frame 204, and later frame 212) showing the scene (in this example, two pandas playing cards at a table) comprising at least one action (e.g., pandas playing cards) occurring over a time period corresponding to the first sequence of frames. The first sequence of frames thus corresponds to a temporal sequence of time steps or points in time of the scene, as shown by the arrow of time 206. The action in the example scene includes one or more characters 218 (in this example, two pandas) or other objects 222 (such as cards) performing one or more actions (in this example, both pandas are playing cards) in an environment (shown in this example by a background 220 and a table 224 behind which the pandas are sitting). In some examples, the characters 218, the background 220, and/or other visual elements of the scene can be generated to be photorealistic and contextually appropriate, based on the inputs 102 received by the 4D scene generation system 104.

In some examples, the reference video 202 can be a pre-existing video, such as an actual video view of a real-world scene. In some examples, the reference video 202 can be generated from inputs 102, such as text data, image data, or other suitable data. The inputs 102 can be processed by a generative AI model, such as a text-to-video diffusion model or an image-to-video diffusion model, to generate the reference video 202. In some examples, the reference video 202 is processed or generated at a relatively low resolution in order to simplify the computational steps described herein. Further details of the generation of the reference video 202 are described below with reference to FIG. 3 and FIG. 7.

It will be appreciated that the point of view from which the scene is viewed in the reference video 202 can be fixed, or nearly fixed, in space. Thus, in order to generate view of the scene from other points of view, 3D details of the scene can be generated. In this example, these 3D details are determined by generating the freeze time video 208 based on the reference frame 204 selected from the reference video 202.

The freeze time video 208 includes a second sequence of frames (e.g., including prior freeze time frame 214, reference frame 204, and later freeze time frame 216) showing the same scene as the first sequence of frames from a plurality of points of view. In the second sequence of frames, the at least one action of the scene is shown paused or frozen at a time corresponding to the reference frame 204. Whereas the second sequence of frames correspond to a temporal sequence of views captured by a virtual camera moving through the frozen scene (as shown by the arrow of camera motion 226), it will be appreciated that each frame of the second sequence of frames can be generated by shifting the point of view forward or backward from the reference frame 204 along a POV trajectory, as shown by the arrows from the reference frame 204 to the prior freeze time frame 214 and to the later freeze time frame 216. Further details of the generation of the freeze time video 208 from the reference video 202 are described below with reference to FIG. 3 and FIG. 7.

Thus, as the POV of the freeze time video 208 moves along the trajectory of camera motion 226, the views of the frozen or paused scene will change: the angle of the table 224 will change and it will occlude different portions of the characters 218; the visible portions and perspectives on the characters 218 and objects 222 will change; and the portions of the background 220 that are visible, and the appearance of the background 220 due to change in perspective, will also change.

Figure 3:
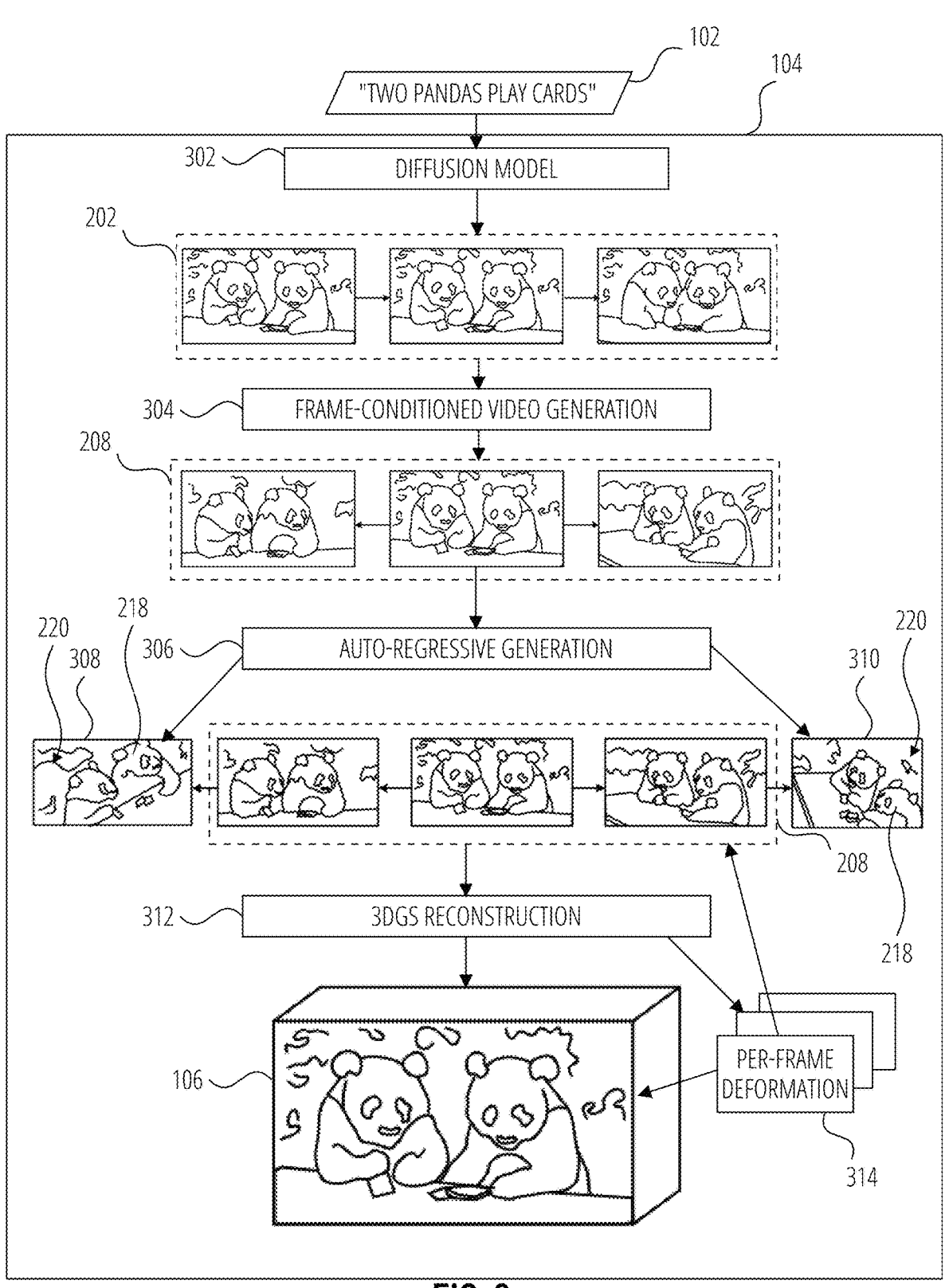
FIG. 3 is a schematic diagram showing generation of a 3D representation of a scene based on a reference video and a freeze time video, according to some examples.

FIG. 3 shows the operation of functional modules of the 4D scene generation system 104 used to generate the 4D scene model 110. As described with reference to FIG. 1, a diffusion model 302 can receive one or more inputs 102 to generate the reference video 202. The diffusion model 302 can be a model, such as a text-to-video or image-to-video diffusion model using a transformer architecture, that has been trained to generate videos based on one or more inputs 102. In some examples, the use of a transformer-based architecture by the diffusion model 302 can result in improved quality, scalability, and/or training efficiency relative to other architectures.

Thus, in some examples, the frame-conditioned video generation 304 modules uses a modified video diffusion model which is a text-to-video diffusion model that diffuses pixel values instead of latents, resulting in less motion blur and fewer gridding effects, which are more common in latent diffusion models. The modified video diffusion model can also produce larger camera and object motions than other available models. In some examples, a modified video diffusion model variant can be trained to generate videos from both text prompts and an arbitrary set of video frame inputs, which can then be used in further operations described below. This feature can enhance flexibility for auto-regressive generation 306, particularly when creating freeze-time videos with extensive view coverage.

The output of the diffusion model 302 is the reference video 202, as described above with reference to FIG. 2. The reference video 202 can serve as an initial target for 4D reconstruction by capturing the desired dynamic 4D scene.

After the reference video 202 has been generated, a frame-conditioned video generation 304 module of the 4D scene generation system 104 can be applied to the reference video 202 to generate the freeze time video 208. In some examples, frame-conditioned video generation 304 generates the freeze time video 208 based on a selected frame from the reference video 202, such as the reference frame 204. The frame-conditioned video generation 304 module can include or make use of a video generation model, such as a variant of the diffusion model 302, that is trained to generate videos from both text prompts and an arbitrary set of video frame inputs. In some examples, generation of the freeze time video 208 involves dataset context embedding and/or prompt engineering. For example, textual phrases such as "camera circulating around" and "time elapse" can be added to the beginning and end of a textual input prompt (e.g., input 102 such as "pandas play cards"). In some examples, the textual prompt can be further modified by omitting action verbs: for example, "pandas play cards" can be modified to "pandas cards", "pandas, cards", "pandas and cards", or a similar phrase omitting action verbs such as "play". Thus, in some examples, the model used to generate the freeze time video 208 based on the reference video 202 can be further prompted by text data such as "camera moves around pandas and cards, time elapse".

The freeze time video 208 is thereby generated by the frame-conditioned video generation 304 module of the 4D scene generation system 104 based at least on the reference video 202, and potentially also based on additional inputs such as engineered textual prompts and/or dataset context embeddings.

In some examples, the modified video diffusion model described above, which may also be referred to as a masked video diffusion model, is trained to generate videos using both text and a set of known frames as conditioning, and can be used by the frame-conditioned video generation 304 module to generate the freeze time video 208 from the reference video 202. Given a set of known frames at arbitrary positions in the input sequence (e.g., the first sequence of frames of the reference video 202), the modified video diffusion model produces an output video whose frames at those positions match the known frames (e.g., the second sequence of frames of the freeze time video 208). This mechanism allows the masked or modified video diffusion model to perform various tasks such as image animation, frame interpolation, and temporal extension of videos by providing known frames in the corresponding arrangements. In some examples, a masked or modified video diffusion model can be obtained by providing three additional input channels to accommodate the conditioning frames input, and by training the model for an additional number of steps using a masked video modeling objective, while keeping the other training parameters unchanged. In some examples, a set of masking strategies can be employed which define the set of known frames provided as conditioning during training, each of which is randomly applied to an input batch element with probability m.

The modified video diffusion model can therefore be used in any of several different tasks. As a first example, it can be used for unconditional generation by setting m=0.6 and masking the whole input video. As a second example, the modified video diffusion model can be used in a Bernoulli mode by setting m=0.3 and masking each frame of the input video with probability ($1\frac{1}{16}$), leaving on average a single frame unmasked. As a third example, the modified video diffusion model can be used to perform frame interpolation by setting m=0.075 and masking all video frames apart from a set of frames sampled at regular time intervals. As a fourth example, the modified video diffusion model can be used for video extension by setting m=0.075 and masking the last N video frames.

In some examples, the modified video diffusion model is trained on mixed video datasets, with a unique context embedding for each dataset to guide the model in generating videos that follow the specific distribution. One dataset can consist of static real-world objects with circular camera trajectories, helping the model generate freeze-time videos with large camera motions and minimal object movements when its context embedding is used. The success rate can be further improved by engineering the textual prompts as described above. Despite this, multi-view inconsistency and moderate object motion may still occur in some examples; these inconsistencies and object motion can be mitigated by further reconstruction operations described below.

In some examples, the range of the POV trajectory covered by the freeze time video 208 can be extended backward and/or forward along the POV trajectory by applying an auto-regressive generation 306 module of the 4D scene generation system 104 to the generated freeze time video 208. In some examples, the raw output from the modified video diffusion model is a sequence of frames of fixed or finite length (e.g., 16 frames), resulting in limited POV coverage in the freeze time video 208. To extend POV coverage, iterative auto-regressive generation can be performed by the auto-regressive generation 306 module. At each iteration, the auto-regressive generation 306 module conditions on a predetermined number (e.g., 8) of the previously generated frames, guiding the modified video diffusion model to generate a further number (e.g., 8) of new frames that follow the POV trajectory of the previously-generated frames. In some examples, the auto-regressive generation 306 module extends the POV coverage in both forward and backward directions until it reaches a sufficient range of points of view, such as 180° of change in the POV angle.

The auto-regressive generation 306 module thereby generates additional frames of the freeze time video 208, shown as auto-regressed prior frame 308 and auto-regressed later frame 310. It will be appreciated that an arbitrary number of prior and/or later frames can thereby be generated, such as a sufficient number of frames to span the desired range of points of view. In the illustrated example, the auto-regressed prior frame 308 and auto-regressed later frame 310 show the background 220, characters 218, and other details of the scene from a POV that is further transformed along the POV trajectory (in this example, a circular panning trajectory) relative to the POV of the reference frame 204 shown as the central frame of the freeze time video 208.

The final step shown in FIG. 3 is generation of the 3D representation of the 4D scene model 110, which can be performed by a 3DGS reconstruction 312 module of the 4D scene generation system 104, using the extended freeze time video 208 generated by the auto-regressive generation 306 module as input.

In some examples, Deformable 3D Gaussian Splats (D-3DGS) are used to model the 4D scene. D-3DGS can be useful for dynamic novel view synthesis tasks due to its low rendering computation cost, high-quality rendering fidelity, and compatibility with existing graphics rendering pipelines. D-3DGS uses 3D Gaussian splats that represent the static 3D scene at a canonical frame (e.g., reference frame 204) and a deformation field that models dynamic motions.

3D Gaussian Splats consist of a set of 3D Gaussian points, each associated with an opacity value a and RGB color $c \in R^3$. The position and shape of each 3D Gaussian point are represented by a Gaussian mean position $x \in R^3$ and a covariance matrix, which is factorized into orientation, represented by a quaternion $q \in R^4$, and scaling, represented by $s \in R^3$. 3DGS are rendered by projecting Gaussian points onto the image plane and aggregating pixel values using NeRF-like volumetric rendering equations.

To represent motion in 4D scenes, a deformation field $w_{t-deform}$ can be used that represents the offset of 3DGS from the canonical frame to the frame at time t:

$$w_{t-deform}(x, t) = (\Delta x_t, \Delta q_t), \qquad \text{Equation (1)}$$

The position and orientation of 3DGS at time t are simply obtained by $x_t = x + \Delta x_t$ and $q_t = q + \Delta q_t$. The deformation field w can be obtained using a multi-layer perceptron (MLP) or other suitable model architecture, which can serve as a general representation for arbitrary deformations. In some examples, the MLP can be replaced by more specialized representations, such as linear blend skinning, which can be more suitable for articulated motions. However, some examples use MLPs due to their simplicity and generality.

In some examples, the 3DGS reconstruction 312 module reconstructs the canonical 3DGS representation 106 from the freeze time video 208. The 3DGS reconstruction 312 process includes learning a plurality of temporal deformations (e.g., temporal deformations 112 from FIG. 1) corresponding to transformations of the 3D representation (e.g., canonical 3DGS representation 106) to show the scene at different points in time during the action, and learning a plurality of per-frame deformations 314 that correct for inconsistencies or errors in the freeze time video 208: the generated freeze time video 208 may still contain multi-view inconsistencies, preventing direct reconstruction of a high-quality canonical 3DGS representation 106. These inconsistencies in the freeze time video 208 can include temporally consistent but geometrically incorrect 2D video, and/or object motions across the frames of the freeze time video 208. To address these imperfections, 3DGS reconstruction 312 can be perform as a multi-stage process.

During a warm-up stage, a model is trained (e.g., for 3,000 iterations) without any per-frame deformations to establish a baseline for the canonical 3DGS representation 106. During a deformation learning and Gaussian splat optimization stage, the Gaussians are optimized and the per-frame deformations 314 are learned for each frame of the freeze time video 208 (e.g., over 20,000 iterations). The deformation learning and Gaussian splat optimization stage can include implementing Gaussian splat growth (splitting, cloning, and pruning) for at least a portion of the stage (e.g., during the first 15,000 iterations).

Thus, in some examples, a Gaussian splat growth stage is performed during 3DGS reconstruction 312. An opacity threshold can be set to $\tau\alpha=5\times10^{-3}$, and a gradient threshold to $\tau_{grad}=2\times10^{-4}$. These thresholds help control the addition of new Gaussians based on their opacity and gradient values. In contrast, during a second Gaussian splat growth stage performed during motion fitting, described below with reference to FIG. 4, a relatively higher opacity threshold of $\tau\alpha=1\times10^{-2}$ can be used to avoid introducing redundant Gaussians. This higher threshold ensures that only significant Gaussians are added, which aids in maintaining efficiency and relevance during the motion fitting process.

The per-frame deformations 314 are learned as $w_{multi-view}$ (x, k)=$(\Delta x_k, \Delta q_k)$, to correct for multi-view inconsistencies in the freeze time video 208, where k denotes the frame index of the freeze time video 208, each frame index thus corresponding to a point along the POV trajectory of the freeze time video 208. The per-frame deformations 314 can be used to model imperfections and subtle variations in the scene reconstruction that are not captured by a straightforward POV transformation of the canonical 3DGS representation 106. The canonical 3DGS representation 106 is then reconstructed and learned or refined from the learned per-frame deformations 314, such that each per-frame deformation 314 corresponds to a correction of the POV-transformed view of the canonical 3DGS representation 106 to generate a corresponding corrected frame of the freeze time video 208.

This joint learning of the per-frame deformations 314 and optimization of the canonical 3DGS representation 106 can be achieved by applying one or more loss functions during training. These loss functions can include an image reconstruction loss, a small motion loss, and/or a Score Distillation Sampling (SDS) loss, which can be combined to optimize the canonical 3DGS representation 106.

An image reconstruction loss $L_{recon}$ can be used to compute the difference between images $I_{GS}$ rendered by the deformed (e.g., non-optimized) canonical 3DGS representation 106 and the frames $I_k$ from the freeze time video 208:

$$\mathcal{L}_{recon} = \sum_k \|\mathcal{I}_{GS}(x + \Delta x_k, q + \Delta q_k, s, \alpha, c, P_k) - \mathcal{I}_k\|_1, \quad \text{Equation (2)}$$

where k denotes the frame index, $P_k$ represents a camera projection matrix which can be initialized (e.g., using COLMAP or other suitable Structure-from-Motion (SfM) software), then jointly finetuned with the 3DGS. $(x+\Delta x_k, q+\Delta q_k, s, \alpha, c)$ denote parameters for the deformed 3DGS.

A small motion loss $L_{small\ mo.}$ can be used to minimize the magnitude or size of the per-frame deformations 314. Minimizing $L_{recon}$ alone may be insufficient to obtain a plausible 3DGS representation, because there can be infinitely many pairs of deformation fields and 3DGS representations that produce identical image renderings. To address this underconstrained problem, a small motion loss $L_{small\ mo.}$ can be used to optimize the per-frame deformations 314 for small size:

$$\mathcal{L}_{small\ mo.} = \sum_k \|\Delta x_k\|_1 + \|\Delta q_k\|_1. \quad \text{Equation (3)}$$

A score distillation sampling (SDS) loss can be used for at least a portion of the 3DGS reconstruction 312 process (e.g., in the later stages) to further improve regularization of the canonical 3DGS representation 106. Hand-crafted heuristics like $L_{small\ mo.}$ may be insufficient for generating a plausible canonical 3DGS representation 106, especially with significant multi-view inconsistencies in the freeze time video 208. For improved regularization, in the later stages of optimization, score distillation sampling can be used. SDS ensures that the rendering of the canonical 3DGS representation 106 on randomly sampled POV trajectories aligns with the distribution dictated by the video diffusion model (e.g., the modified video diffusion model). During each optimization step, a POV trajectory is sampled by first randomly selecting a camera pose $P_k$ from the POV trajectory of the freeze time video 208 and then randomly perturbing the camera pose to create $\hat{p}$. A perturbed POV trajectory over multiple (e.g., 16) frames, $\{\hat{p}_k=1, \ldots, 16\}$, is then uniformly interpolated between the canonical camera pose and $\hat{p}$. The canonical 3DGS representation 106 is then rendered using this perturbed POV trajectory to generate video frames:

$$\mathcal{I}^k_{can-GS} := \mathcal{I}_{GS}(x, q, s, \alpha, c, \hat{P}_k), \forall k = 1, \ldots, 16. \quad \text{Equation (4)}$$

To perform score distillation sampling, Gaussian noise is added to the rendered images $I^k_{can-GS}$, such that these images are considered to be frames of a noised video. The video diffusion model (e.g., the modified video diffusion model) is then used to generate one-step denoised images from the noised images (e.g., the frames of the noised video); these can be considered to be frames of a denoised video. Because the sampled POV trajectory originates from the canonical camera pose (e.g., of reference frame 204), the first frame $I^0_{can\text{-}GS}$ of the rendered videos is identical to the corresponding frame $I_c$ from the freeze time video 208, allowing $I^0_{can\text{-}GS}$ to be replaced with $I_c$, which can then serve as the conditional frame for the diffusion model. More specifically:

$$\{\hat{I}_2, \hat{I}_3, \dots, \hat{I}_{16}\} = \qquad \text{Equation (5)}$$

$$f_{denoise}\big(I^2_{can\text{-}GS} + \epsilon_2, I^3_{can\text{-}GS} + \epsilon_3, \dots, I^{16}_{can\text{-}GS} + \epsilon_{16} \mid I_c, \sigma\big),$$

wherein each $\epsilon_n$ represents the noise applied to the corresponding nth video frame, $\sigma$ denotes the noise level for the current diffusion step, and $\hat{I}_k$ indicates the $x_0$ prediction for each frame. Using $I_c$ as the image condition input allows the diffusion model to provide more precise supervisions and sharper details that are aligned with the reference video 202.

SDS can then be performed by minimizing the sum-of-square difference between the rendered video frames $I^k_{can\text{-}GS}$ and the denoised frames $\hat{I}_k$, as follows:

$$\mathcal{L}_{SDS} = \left\lVert I^k_{can\text{-}GS} - \lceil \hat{I}_k \rceil \right\rVert^2 \qquad \text{Equation (6)}$$

In this context, $\lceil \cdot \rceil$ indicates that the variables are detached from the automatic differentiation computation graph.

In some examples, low-resolution images are used for the video frames used in SDS. The modified video diffusion model can be a two-stage pixel-space model that first generates a video at a low resolution (e.g., 36×64 pixels), which is then up-sampled to a higher resolution (e.g., 288×512 pixels). In some examples, the SDS process can employ only the first-stage low-resolution model, as it is significantly less computationally demanding, and it is not straightforward to apply both stages simultaneously. Testing indicates that utilizing just the low-resolution videos in SDS can be adequate to yield high-quality results. This effectiveness can be a result of the techniques described herein relying more on reconstruction loss to enhance fine details, rather than depending primarily on SDS. To compute the SDS loss, the rendered video frames can be randomly shifted and/or cropped to mitigate aliasing effects, then down-sampled to the low resolution.

By performing SDS using the low-resolution, pixel-space modified video diffusion model described above, having a compressed transformer architecture, SDS can be performed significantly faster than existing approaches to SDS. In some examples, the described examples of SDS can be performed in only ≈200 ms per step. Some examples may also be more memory-efficient than existing approaches, allowing for gradient computation across multiple (e.g., all 16) frames in a single batch. This efficiency may make some examples described herein more viable for practical applications.

Thus, the output of the 3DGS reconstruction 312 module is a 3D representation, such as the canonical 3DGS representation 106. This represents the static 3D scene at a canonical frame (e.g., reference frame 204), serving as the foundation for the 4D scene model 110.

In some examples, a deformation regularization operation (not shown in FIG. 3) can be applied to regularize the output of the motion deformation model. The model used to transform the canonical 3DGS representation 106 to generate video frames predicts position offsets ($\Delta x$), rotation offsets ($\Delta q$), and scale offsets ($\Delta s$) for each time step. To prevent unnecessary movements (e.g., in the background) and to ensure movement consistency, an L1 norm regularization loss can be generated and applied, as follows:

$$\mathcal{L}_{norm} = \frac{1}{N}\sum_{i=1}^{N}\big(\lVert\Delta x_i\rVert + \lVert\Delta q_i\rVert + \lVert\Delta s_i\rVert\big). \qquad \text{Equation (7)}$$

A difference loss, denoted as $L_{diff}$, can be used to ensure that the movement or trajectory of each Gaussian is consistent and smooth over time. This loss penalizes abrupt changes in the trajectory, promoting smoother transitions. The difference loss is formulated as follows:

$$\mathcal{L}_{diff} = \frac{1}{N}\sum_{i=1}^{N}\lVert\Delta x_{i,t} - \Delta x_{i,t-1}\rVert. \qquad \text{Equation (8)}$$

Here, $\Delta x_{i,t}$ represents the position offset of Gaussian i at time t.

In some examples, a local-rigidity loss $L_{rigid}$ and/or a rotational loss $L_{rot}$ can also be used, as described in (Jonathon Luiten, Georgios Kopanas, Bastian Leibe, and Deva Ramanan. Dynamic 3d gaussians: Tracking by persistent dynamic view synthesis. arXiv preprint arXiv:2308.09713, 2023, which is hereby incorporated by reference in its entirety). For the local-rigidity loss, a weighting scheme can be applied that utilizes an unnormalized Gaussian weighting factor. This factor assigns different weights to each point based on its proximity to the center of the Gaussian distribution. The unnormalized Gaussian weighting factor is defined as follows:

$$w_{i,j} = \exp\big(-\lambda_w \lVert x_{j,0} - x_{i,0}\rVert_2^2\big) \qquad \text{Equation (9)}$$

Using this weighting scheme, a local-rigidity loss $L_{rigid}$ is employed, defined as follows:

$$\mathcal{L}^{i,j}_{rigid} = w_{i,j}\left\lVert(x_{j,t-1} - x_{i,t-1}) - R_{i,t-1}R_{i,t}^{-1}(x_{j,t} - x_{i,t})\right\rVert_2, \qquad \text{Equation (10)}$$

$$\mathcal{L}_{rigid} = \frac{1}{k|G|}\sum_{i\in G}\sum_{j\in knn_{i;k}}\mathcal{L}^{i,j}_{rigid}. \qquad \text{Equation (11)}$$

This loss can ensure that for each Gaussian i, neighboring Gaussians j move in a manner consistent with the rigid body transformation of the coordinate system over time. Specifically, this means that the relative positions and orientations of neighboring Gaussians are maintained as the coordinate system evolves, ensuring a coherent and physically plausible motion pattern.

Additionally, a rotational loss $L_{rot}$ can be used to ensure consistent rotations among neighboring Gaussians across different time steps. The rotational loss function helps maintain the relative orientations of nearby Gaussians as they evolve, preserving the overall rotational coherence of the system. The rotational loss is expressed as:

$$\mathcal{L}_{rot} = \frac{1}{k|G|}\sum_{i\in G}\sum_{j\in knn_{i;k}} w_{i,j}\left\lVert\hat{q}_{j,t}\hat{q}_{j,t-1}^{-1} - \hat{q}_{i,t}\hat{q}_{i,t-1}^{-1}\right\rVert_2, \qquad \text{Equation (12)}$$

Here, $\hat{q}$ represents the normalized quaternion rotation of each Gaussian. The k-nearest neighbors, identified in the same manner as in the preceding losses, are utilized to ensure consistent rotational behavior among neighboring Gaussians.

In some examples, for the regularization terms mentioned above, a weight (e.g., 0.01) can be assigned to each loss within the overall loss function, ensuring that they contribute appropriately to the optimization process. For the reconstruction loss, a greater weight (e.g., 1) can be used. Additionally, for the SDS loss described above and expanded upon below with reference to FIG. 5, the weights can be differentiated based on the type of SDS being applied: for example, a weight of 20 for temporal SDS and a weight of 5 for multi-view SDS. These weights can be chosen to effectively capture motion dynamics and stabilize the training process.

Figure 4:
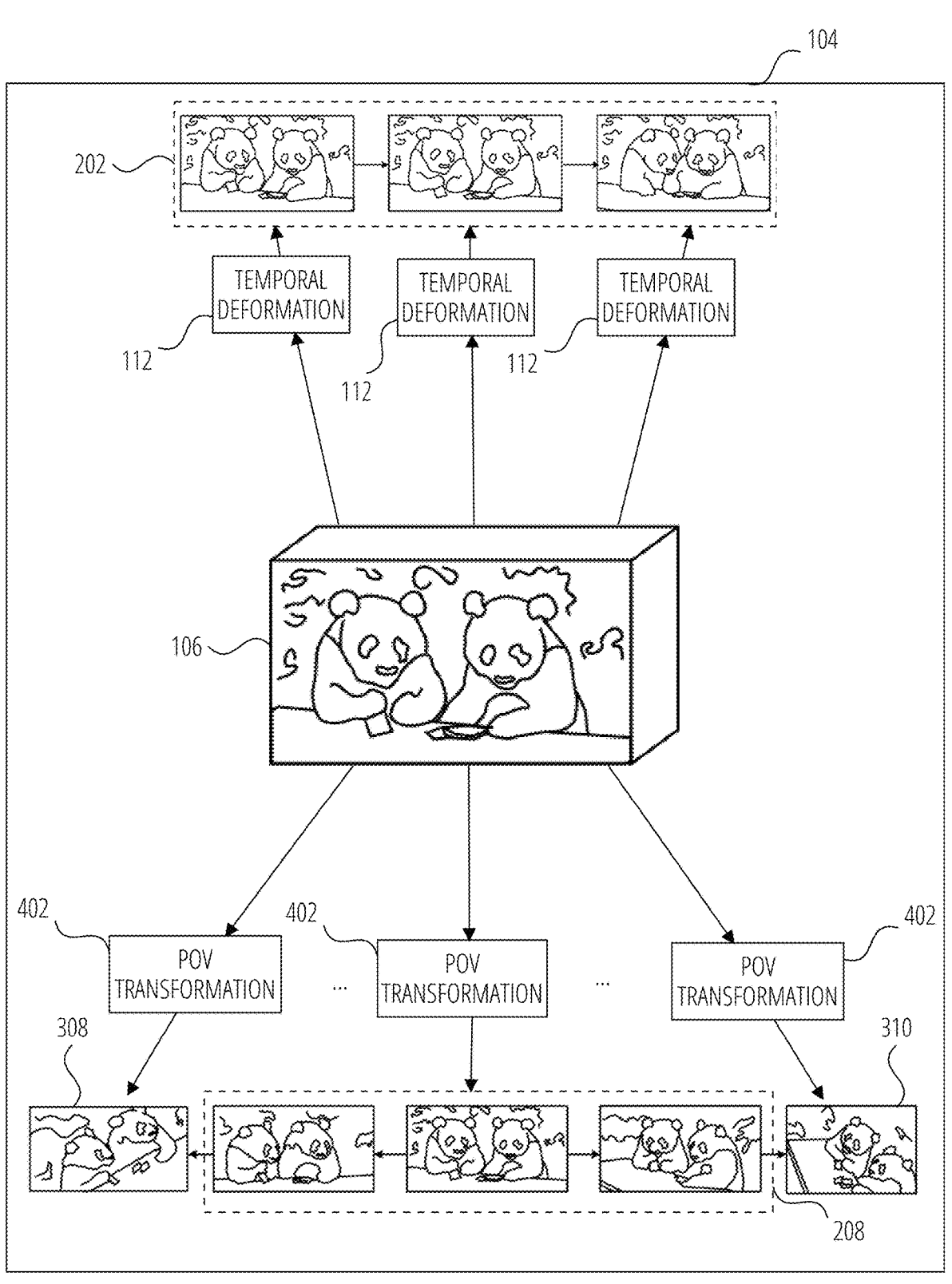
FIG. 4 is a schematic diagram showing generation of a set of temporal deformations of a 3D representation to reconstruct frames of a reference video, and using a set of point of view (POV) transformations of the 3D representation to reconstruct frames of a freeze time video, according to some examples.

Regardless of whether deformation regularization is performed, the 4D scene generation system 104 then uses the canonical 3DGS representation 106 as generated and refined by the 3DGS reconstruction 312 to perform motion fitting, as shown in FIG. 4.

FIG. 4 illustrates the process of processing the canonical 3DGS representation 106 and reference video 202 to generate a set of temporal deformations 112.

The canonical 3DGS representation 106 generated by the 3DGS reconstruction 312 of FIG. 3 represents the static 3D scene at a canonical frame, such as reference frame 204, serving as the foundation for the 4D scene. The canonical 3DGS representation 106 can include a set of 3D Gaussian points, each associated with position, opacity, color, orientation, and scaling parameters.

The POV transformations 402 shown in FIG. 4 represent spatial transformations applied to the canonical 3DGS representation 106 to render frames of the corrected freeze time video 208.

After the canonical 3DGS representation 106 has been generated and refined, the 4D scene generation system 104 can model temporal motion by fitting a deformation field (as specified above in Equation (1)) to align with the reference video 202. Each temporal deformation 112 thus represents a transformation of the canonical 3DGS representation 106 to render a frame of the reference video 202. In some examples, each temporal deformation 112 represents the offset of the canonical 3DGS representation 106 from the reference frame 204 to any given time t, allowing for modeling dynamic motions and interactions in the scene. The temporal deformations 112 thus model a deformation field $w_{t\text{-}deform}(x, t)=(\Delta x_t, \Delta q_t)$, where $\Delta x_t$ and $\Delta q_t$ represent the position and orientation offsets, respectively, from the canonical 3DGS representation 106 corresponding to reference frame 204.

In some examples, the set of temporal deformations 112 is modeled by a first deformation network, and the set of per-frame deformations 314 is modeled by a second deformation network. Both deformation networks can consist of an MLP, $F\theta$: $(\gamma(x), \gamma(t))\rightarrow(\Delta x, \Delta q, \Delta s)$, which applies position embedding $\gamma$ on each coordinate of the 3D Gaussians and time (or per-frame deformation code) and maps them to their corresponding deviations in position, rotation, and scaling. The weights $\theta$ of the MLP are optimized during this mapping process. Each MLP $F\theta$ processes the input through one or more (e.g., eight) fully connected layers, each employing ReLU activations and containing 256-dimensional hidden units, resulting in a 256-dimensional feature vector. This feature vector is then passed through three additional fully connected layers (without activation functions) to independently output the offsets for position, rotation, and scaling over time. Similar to NeRF, the feature vector and the input can be concatenated at the fourth layer, enhancing the network's ability to capture complex deformations.

In some examples, the generation of the temporal deformations 112 shown in FIG. 4 can be performed by a further functional module of the 4D scene generation system 104, such as a temporal deformation reconstruction module or motion fitting module (not shown). Like the 3DGS reconstruction 312 process, the motion fitting process can proceed in multiple stages in some examples.

In some examples, the motion fitting process includes an initial motion fitting stage to train the temporal deformations 112 using only the reference video 202 and canonical 3DGS representation 106, followed by a Gaussian splat growth stage for motion compensation, followed by a simultaneous fine-tuning stage to fine-tune the canonical 3DGS representation 106 and temporal deformations 112, and finally followed by a further SDS stage using both multi-view and temporal SDS videos.

The initial motion fitting stage can be used to learn the temporal deformations 112 to the canonical 3DGS representation 106 by aligning them with the reference video 202. The canonical 3DGS representation 106 is not changed during this stage; instead, the parameters of the temporal deformations 112 are simply trained to map the canonical 3DGS representation 106 to each frame of the reference video 202. In some examples, the initial motion fitting stage can be performed over 10,000 training iterations.

The Gaussian splat growth stage can be performed after initial motion fitting to further optimize the canonical 3DGS representation 106. New Gaussian splats can be added to the canonical 3DGS representation 106 to represent missing points in the canonical space caused by motion. In some examples, the existing Gaussian splats of the canonical 3DGS representation 106 learned in previous stages can be fixed, and only new Gaussian splats added during this stage can be optimized. For example, the attributes (position, rotation, scale, opacity and color) of the learned canonical Gaussians can be fixed by stopping the gradient flow to those attributes. Instead, the focus of this stage is on performing splitting, cloning, and pruning operations based on the gradients of the newly added Gaussians. These new Gaussians are introduced at the beginning of the growth stage, specifically according to the gradients derived from the canonical Gaussians. This method can ensure that the canonical structure remains stable while allowing the newly added Gaussians to adapt and optimize the motion fitting process.

In some examples, the Gaussian splat growth stage can be performed over 5,000 additional training iterations.

The simultaneous fine-tuning stage can be performed after the Gaussian splat growth stage to simultaneously and jointly fine-tune the canonical 3DGS representation 106 (now including the additional GS added during the Gaussian splat growth stage) and the temporal deformations 112 using training frames representative of different camera views and timesteps.

The further SDS stage can be performed after the simultaneous fine-tuning stage. The further SDS stage is described in greater detail below with reference to FIG. 5.

Figure 5:
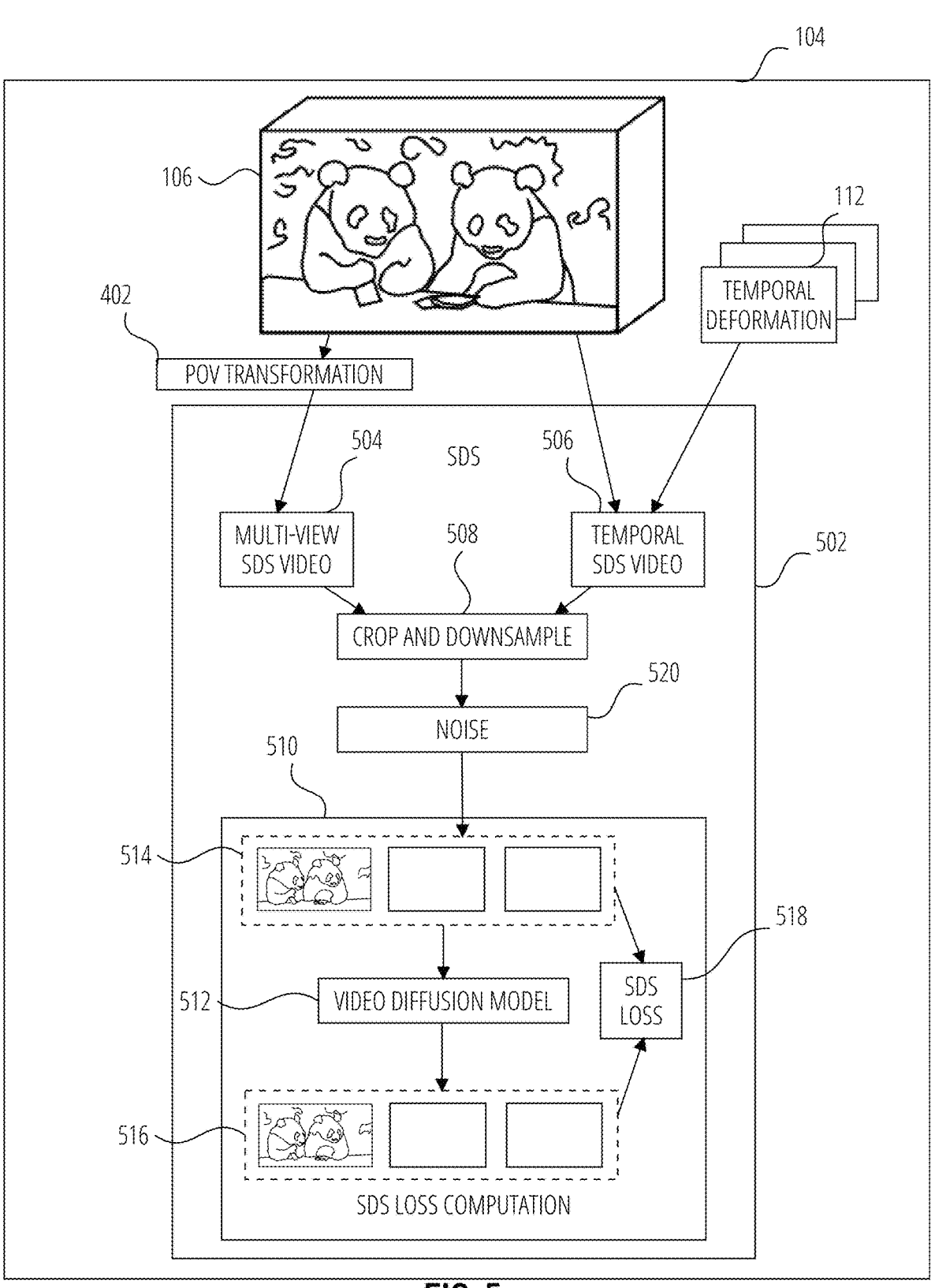
FIG. 5 is a schematic diagram showing a two-part Score Distillation Sampling (SDS) training stage using multi-view and temporal SDS videos to further train a 4D scene model, according to some examples.

FIG. 5 illustrates the further Score Distillation Sampling (SDS) stage performed at the end of motion fitting. Thus, the illustrated further SDS operation can be performed in the later stages of training to improve the accuracy of the 4D scene model 110, including the canonical 3DGS representation 106 and the temporal deformations 112.

The further SDS process, shown as SDS 502, involves generating one or more multi-view SDS videos 504 showing the scene from multiple points of view and one or more temporal SDS videos 506 showing the scene at multiple times during the action. The multi-view SDS video 504 is generated by applying POV transformations 402 to the canonical 3DGS representation 106, whereas the temporal SDS videos 506 are generated by applying the temporal deformations 112 to the canonical 3DGS representation 106. These videos 504 and 506 can be randomly cropped, shifted, and/or downsampled (shown as crop and downsample 508), as described above with respect to the first SDS stage. Noise is then added to these videos (shown as noise 520), and the noised videos 514 are then processed by an SDS loss computation 510 module of the 4D scene generation system 104. The SDS loss computation 510 module uses a video diffusion model (e.g., the modified video diffusion model described above, shown as video diffusion model 512) to generate a corresponding denoised video 516 for each noised video 514. An SDS loss 518 is generated based on a difference between the noised video 514 and the corresponding denoised video 516, and this SDS loss 518 is used for further training of the 4D scene model.

In some examples, the further SDS 502 stage can be performed toward the end of the simultaneous fine-tuning stage, for example, over the last 5,000 training iterations of 35,000 or 40,000 training iterations of the simultaneous fine-tuning stage.

In some examples, each iteration of the further SDS 502 process proceeds by randomly sampling either a camera pose or a timestep. This sampling determines the specific spatial (view) dimension or the temporal (time) dimension to train. By alternating between these two types of SDS, both spatial and temporal aspects can be covered during this stage of training. This strategy can enhance the overall consistency and robustness of the 4D scene model 110. For each SDS 502 step, a number M (e.g., M=16) of frame poses are sampled. Frames are then rendering for each frame pose, either following the sequence of camera movement or based on the order of time.

In some examples, noisy virtual trajectory sampling is performed for the multi-view SDS videos 504 during the further SDS 502 process. A POV pose can be randomly sampled that is different from the reference pose used to generate the temporal SDS video 506. Subsequently, a second POV pose can be sampled within a specified radius of a circle centered on the first randomly sampled POV pose. By interpolating between this second POV pose and the reference POV pose, M frame poses can be specified for rendering. This approach can ensure a diverse set of viewpoints, enhancing the robustness and accuracy of the multi-view SDS process. When inputting the high-resolution rendered images into the low-resolution model for SDS 502, one of two preprocessing steps can be applied, for example, one of the two preprocessing steps can be selected with equal probability. In the first preprocessing step option, the image is randomly shifted by S−1 pixels (where S is the downsampling scale); in the second preprocessing step option, the image is randomly cropped to half its size. Following this, the image is downsampled and input into the low-resolution model. This preprocessing can ensure that the low-resolution model receives varied inputs, enhancing the robustness of the training process.

FIG. 6 illustrates an example method 600 for generating views of a scene. Whereas the method 600 is described in reference to the 4D scene generation system 104 described above, it will be appreciated that some examples can be performed by other suitable systems, devices, or components.

Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes obtaining a 4D scene model 110 at operation 602. The 4D scene model 110 includes a 3D representation of a scene (such as canonical 3DGS representation 106) and a set of temporal deformations 112. A detailed example of operation 602 is illustrated and described below with reference to FIG. 7, which shows an example of how to train the 4D scene model 110 in accordance with the training techniques described herein (e.g., those described with reference to FIG. 2 through FIG. 5 above). However, it will be appreciated that other 4D scene models, trained or otherwise generated in accordance with different techniques, can be used to perform method 600 in some examples. In some examples, the components of the 4D scene model, such as the 3D representation, temporal deformations, and per-frame deformations, are generated based on a reference video showing the action occurring in the scene, using techniques as described in reference to the example 4D scene generation system 104 or using other techniques for deriving 3D scene information, temporal deformations, and per-frame deformations from video input.

According to some examples, the method 600 includes applying at least one deformation to the 3D representation to generate one or more views of the scene at operation 604. The canonical 3DGS representation 106 can be processed by the 4D scene generation system 104 by applying one or more of the temporal deformations 112 and/or POV transformations 402 to generate one or more views of the scene, such as video frames showing the action within the scene at a specific point in time, seen from a particular POV. The temporal deformations 112, after having been trained as described above, can be applied to the trained canonical 3DGS representation 106 along with POV transformations 402 to generate views of the scene at arbitrary points in time from arbitrary points of view, using the Gaussian splat deformation techniques described above. In some examples, different types of 3D representations can be used, and the various temporal and/or per-frame deformations can be applied to the different 3D representation to generate views of the scene.

In some examples, operation 604 includes one or more of operation 606 through operation 612.

According to some examples, operation 604 includes receiving pose data from an XR device at operation 606. Examples of XR devices and systems are described below with reference to FIG. 9 through FIG. 19. Some XR devices or systems include position components 1832, motion components 1828, and/or environmental components 1830 (see FIG. 18) for determining a pose of the XR device. For example, an inertial measurement unit (IMU) or other position sensor can be used by a head-mounted or hand-held XR device to continuously determine the orientation and location of one or more cameras of the XR device. This orientation and location information is referred to herein as pose data. The pose data can be generated (e.g., by the position components 1832 of an XR device) and provided to the 4D scene generation system 104.

According to some examples, operation 604 includes selecting or generating at least one POV transformation 402 based on the pose data at operation 608. In some examples, the 4D scene generation system 104 includes a pose data processing module for determining a POV transformation 402 (e.g., translation and/or rotation in any of one to three dimensions or axes) of the pose corresponding to the pose data from the canonical pose of the reference frame 204. For example, the 4D scene generation system 104 can process the pose data continuously or periodically (e.g., at 30 frames per second or another suitable rate) to update a POV of the XR device relative to a scene that has already been presented at a given POV.

According to some examples, operation 604 includes applying the selected or generated POV transformation 402 to the 3D representation to generate at least one view of the scene from at least one viewpoint corresponding to the pose data at operation 610. In some examples, once the POV transformation 402 has been selected or generated, the 4D scene generation system 104 renders a new view of the scene (e.g., a video frame) from the updated POV corresponding to the pose data (e.g., the pose of the XR device) by applying the POV transformation 402 to the canonical 3DGS representation 106 as described above. In some examples, the rendering of the updated view of the scene also includes applying one or more temporal deformations 112 based on time elapsed since the last update, such that the view rendered for the XR device shows the action in the scene occurring over time while the POV of the XR device changes to provide a changed POV on the scene.

According to some examples, operation 604 includes displaying the at least one view on the XR device in real-time at operation 612. The rendered updated view can be displayed on a display of the XR device (such as one of the displays of the display system 900 of FIG. 9). In some examples, operation 604, including operation 606 through operation 612, can be performed for each display of a binocular display, such as the display system 900 of FIG. 9, in order to render two different points of view of the scene for two displays, and thereby providing a stereoscopic view of the scene that enhances the realism of the 3D appearance of the scene.

It will be appreciated that some examples may operate the 4D scene generation system 104 and its 4D scene model 110 differently to achieve different effects. The 4D scene model 110 can be used by the 4D scene generation system 104 to generate stereoscopic or monoscopic videos of a scene, such as the output video 108 of FIG. 1. The 4D scene model 110 can be used by the 4D scene generation system 104 to generate multiple views of the scene from different points of view. The 4D scene model 110 can be used by the 4D scene generation system 104 to generate views of the scene that can be navigated temporally by a user, to jump or traverse forward in backward in time to view different portions of the action being performed. The 4D scene model 110 can be used by the 4D scene generation system 104 to generate dynamic 3D effects that can be applied to other content, such as 3D animations applied to a real-world scene or object viewed through an XR display. It will be appreciated that there are many other potential applications of the 4D scene generation system 104 and 4D scene model 110 for generating and applying 4D scene information to generate different interactive or non-interactive spatial and temporal views of a scene.

FIG. 7 shows an example of operation 602 for obtaining the 4D scene model in the method 600 of FIG. 6. As with method 600, the sub-operations of operation 602 are described in reference to the techniques described above, but in some examples could be implemented using other techniques.

Although the example operation 602 shown in FIG. 7 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, operation 602 includes obtaining a reference video 202 at operation 702. The reference video 202 shows the scene, and the scene includes at least one action occurring over a time period. As described above, in some examples, the reference video 202 is generated using a diffusion model (such as diffusion model 302) based on one or more inputs 102. In some examples, the reference video 202 can be a pre-existing video, or a video captured by a camera (e.g., a camera of an XR device, such as display system 900 of FIG. 9).

According to some examples, operation 602 includes processing the reference video 202 to generate a freeze time video 208 at operation 704. The freeze time video 208 shows the scene from the reference video 202 from a plurality of points of view. The freeze time video 208 can be generated as described above using frame-conditioned video generation 304. In some examples, the freeze time video 208 is also expanded in one or both directions along the POV trajectory using auto-regressive generation 306.

According to some examples, operation 602 includes processing the freeze time video 208 to generate the 3D representation of the scene at operation 706. In some examples, the 3D representation is a canonical 3DGS representation 106. The canonical 3DGS representation 106 can be reconstructed from the freeze time video 208 by learning both the canonical 3DGS representation 106 and the set of per-frame deformations 314 simultaneously. In some examples, operation 706 includes the various stages of per-frame deformation and 3DGS reconstruction described above with reference to 3DGS reconstruction 312, including learning the per-frame deformations 314, optimizing and growing the canonical 3DGS representation 106, and performing the first SDS stage (including only multi-view SDS).

According to some examples, operation 602 includes processing the reference video 202 and the 3D representation (such as canonical 3DGS representation 106) to generate the temporal deformations 112 at operation 708. The learning of the temporal deformations 112 is performed during motion fitting, after the refinement of the canonical 3DGS representation 106 jointly with learning the per-frame deformations 314, as described with reference to FIG. 4. In some examples, the canonical 3DGS representation 106 is trained or optimized further during the learning of the temporal deformations 112 at operation 708. Operation 708 can include the stages of motion fitting described above: an initial motion fitting stage, a Gaussian splat growth stage, a simultaneous fine-tuning stage, and a further SDS stage. In some examples, the further SDS 502 stage can include further optimization of the temporal deformations 112, as described with reference to FIG. 5.

Figure 8:
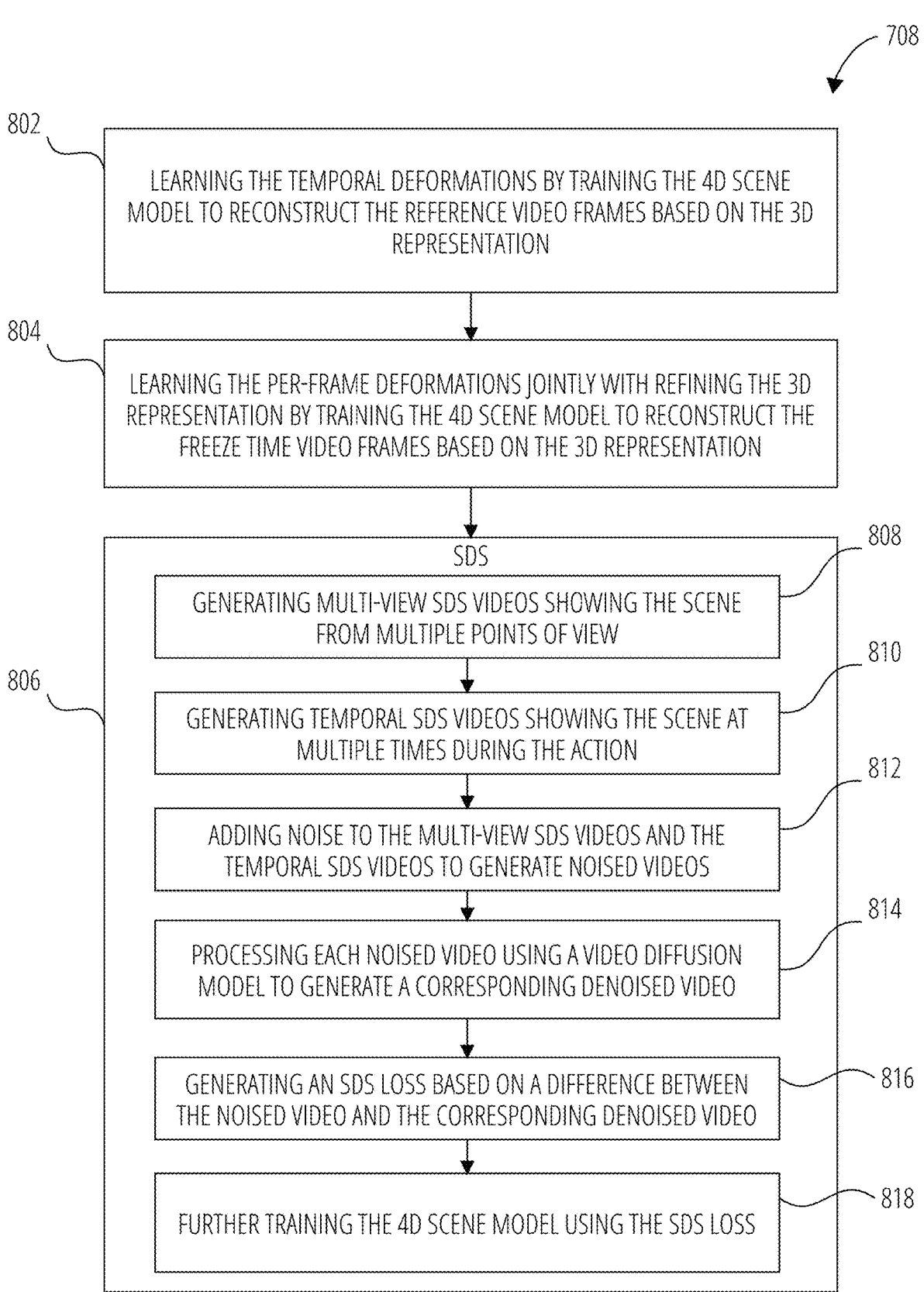
FIG. 8 is a flowchart showing an example of generating the deformations of FIG. 7, according to some examples.

FIG. 8 shows an example implementation of operation 708 of FIG. 7 for generating the temporal deformations 112.

Although the example operation 708 depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, operation 708 includes learning the temporal deformations 112 by training the 4D scene model 110 to reconstruct the reference video 202 frames based on the 3D representation (such as canonical 3DGS representation 106) at operation 802.

According to some examples, operation 708 includes learning the per-frame deformations 314 by training the 4D scene model 110 to reconstruct the freeze time video 208 frames based on the 3D representation at operation 804.

It will be appreciated that the techniques described herein involve first generating the per-frame deformations 314 in parallel with training the canonical 3DGS representation 106 during 3DGS reconstruction 312, followed by generating the temporal deformations 112 during motion fitting, such that operation 804 precedes operation 802. However, the ongoing optimization of the canonical 3DGS representation 106, temporal deformations 112, and per-frame deformations 314 described herein can mean that various of the operations shown in FIG. 8 can be performed iteratively and/or in parallel in some examples.

According to some examples, operation 708 includes performing a further SDS 502 stage at operation 806. In the illustrated example, operation 806 includes operation 808 through operation 818.

According to some examples, operation 808 includes generating one or more multi-view SDS videos 504 showing the scene from multiple points of view at operation 808.

According to some examples, operation 808 includes generating one or more temporal SDS videos 506 showing the scene at multiple times during the action at operation 810.

According to some examples, operation 808 includes adding noise to the multi-view SDS videos 504 and the temporal SDS videos 506 to generate noised videos 514 at operation 812. In some examples, the videos can be cropped, shifted, and/or downsampled in addition to being noised, as described above with reference to FIG. 5.

According to some examples, operation 808 includes processing each noised video 514 using a video diffusion model (such as video diffusion model 512) to generate a corresponding denoised video 516 at operation 814.

According to some examples, operation 808 includes generating an SDS loss 518 based on a difference between the noised video 514 and the corresponding denoised video 516 at operation 816.

According to some examples, operation 808 includes furthering training the 4D scene model 110 using the SDS loss 518 at operation 818. For example, as described above, the set of temporal deformations 112 can be optimized using the SDS loss 518 in later stages of training.

Figure 9:
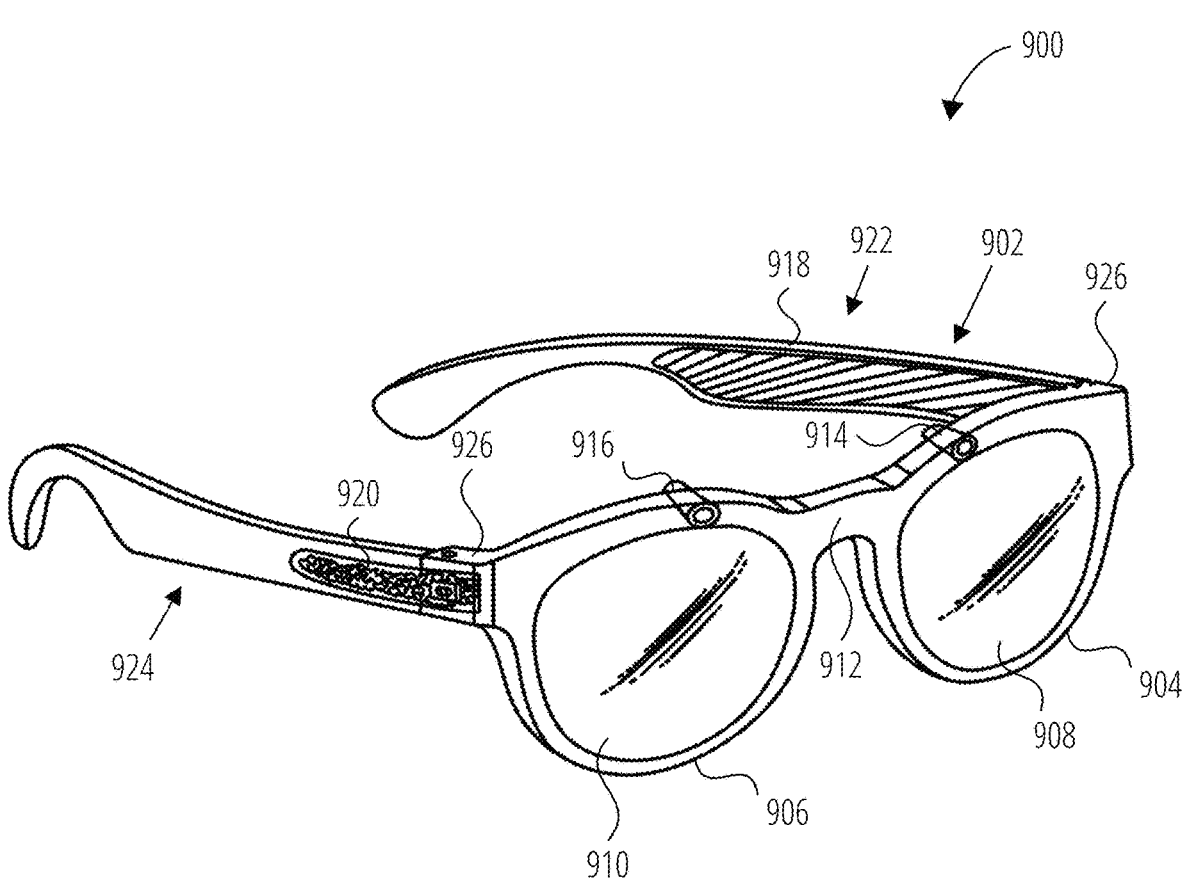
FIG. 9 is a perspective view of a head-worn device, in accordance with some examples.

FIG. 9 is a perspective view of a head-worn XR device (e.g., a display system 900 shown as XR glasses), in accordance with some examples. The display system 900, in this instance, can be worn to view augmented or virtual content displayed over real content visible in a content interaction system.

The display system 900 can include a frame 902 made from any suitable material such as plastic or metal, including any suitable shape memory alloy, as is well known for ophthalmic eyewear. In one or more examples, the frame 902 includes a first or left optical element holder 904 (e.g., a display or lens holder) and a second or right optical element holder 906 (e.g., a display or lens holder) connected by a bridge 912. A first or left optical element 908 and a second or right optical element 910 can be provided within respective left optical element holder 904 and right optical element holder 906. The right optical element 910 and the left optical element 908 can be a lens, a display, a display assembly, or a combination of the foregoing. Any suitable display assembly can be provided in the display system 900. The right optical element 910 and the left optical element 908 can each be considered to provide a display configured to present an image at a virtual image surface having a plurality of virtual image surface locations, as described below with reference to FIG. 10.

The frame 902 additionally includes a left arm or temple piece 922 and a right arm or temple piece 924. In some examples the frame 902 can be formed from a single piece of material so as to have a unitary or integral construction.

In some examples, some of the optical elements, such as the projector, waveguide, and other components of the display system 900 are mounted in a separately assembled optical support system. The optical support system includes a monocular chassis that integrates optical components such as the projector, waveguide, and other components into a single sub-assembly. In some examples, the optical support system is provided as a sub-assembly in two versions, left handed and right handed that make up a binocular pair and can be installed into the frame 102, for example into the first or left optical element holder 104 and the second or right optical element holder 106, respectively. An example optical support system is described further below with reference to FIG. 11. The example shown in that view is right handed as worn by a user.

The display system 900 can include a computing device, such as a computer 920 having a processor and a memory storing instructions for execution by the processor. The computer 920 can be of any suitable type so as to be carried by the frame 902 and, in one or more examples, of a suitable size and shape so as to be partially disposed in one of the left temple piece 922 or the right temple piece 924. The computer 920 can include one or more processors with memory, wireless communication circuitry, and a power source. Various other examples may include these elements in different configurations or integrated together in different ways. In some examples, the computer 920 can be implemented by a machine 1800 or machine 1904 as described below with reference to FIG. 18 or FIG. 19.

The computer 920 additionally includes a battery 918 or other suitable portable power supply. In some examples, the battery 918 is disposed in the left temple piece 922 and is electrically coupled to the computer 920 disposed in the right temple piece 924, or vice versa. The display system 900 can include a connector or port (not shown) suitable for charging the battery 918, a wireless receiver, transmitter or transceiver (not shown), or a combination of such devices.

The display system 900 can include a first or left camera 914 and a second or right camera 916. Although two cameras are depicted, other examples contemplate the use of a single or additional (i.e., more than two) cameras. In one or more examples, the display system 900 can include any number of input sensors or other input/output devices in addition to the left camera 914 and the right camera 916, such as location sensors, motion sensors, and so forth. It will be appreciated that the cameras 914, 916 are a form of optical sensor, and that the display system 900 can include additional types of optical sensors in some examples.

Figure 10:
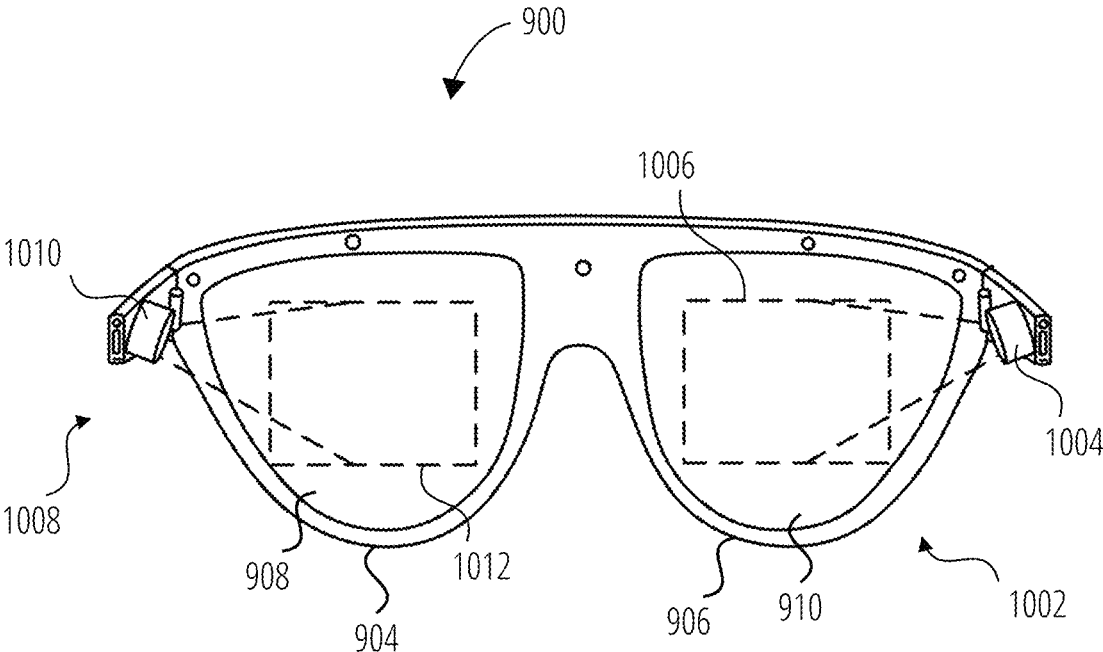
FIG. 10 illustrates a further view of the head-worn device of FIG. 9, in accordance with some examples.

FIG. 10 illustrates the display system 900 from the perspective of a user. For clarity, a number of the elements shown in FIG. 9 have been omitted. As described in FIG. 9, the display system 900 shown in FIG. 10 includes left optical element 908 and right optical element 910 secured within the left optical element holder 904 and the right optical element holder 906, respectively.

The display system 900 include right forward optical assembly 1002 comprising a right projector 1004 and a right display device 1006, and a left forward optical assembly 1008 including a left projector 1010 and a left display device 1012. The right forward optical assembly 1002 (with or without right optical element 910) may be referred to herein as a right near-eye display, the left forward optical assembly 1008 (with or without left optical element 908) may be referred to herein as a left near-eye display, and each may be referred to herein as a near-eye display or a near-eye optical see-through XR display.

In some examples, the right display devices 1006 are waveguides. The waveguides include reflective or diffractive structures (e.g., gratings, holograms and/or optical elements such as mirrors, lenses, or prisms). Projected light emitted by the right projector 1004 encounters the diffractive structures of the waveguide of the right display device 1006, which directs the light towards the right eye of a user to provide an image (e.g., a right-eye image) on or in the right optical element 910 that overlays the view of the real world seen by the user. Similarly, projected light emitted by the left projector 1010 encounters the diffractive structures of the waveguide of the left display device 1012, which directs the light towards the left eye of a user to provide an image (e.g., a left-eye image) on or in the left optical element 908 that overlays the view of the real world seen by the user. The combination of a graphics processing unit (GPU), the right forward optical assembly 1002, the left forward optical assembly 208, the left optical element 908, and the right optical element 910 provide an optical engine of the display system 900. The display system 900 uses the optical engine to generate an overlay of the real world view of the user, including display of a 3D user interface to the user of the display system 900. The surface of the optical element 908 or 910 from which the projected light exits toward the user's eye is referred to as a user-facing surface, an image presentation surface, an eye-side surface, an eye-facing surface, or a display surface of the near-eye optical see-through XR display, whereas the opposite side of the optical element 108 or 110 may be referred to as a world-side surface or world-facing surface. The light exits the image presentation surface of the waveguide at one or more exit pupil locations; at each exit pupil location, the different portions of the image exit at different angles. As a result of the angles at which the light exits the exit pupils toward the user's eye, the image is perceived by a user as extending across a surface in space, referred to herein as a virtual image surface. The virtual image surface is a surface in physical space where the user's eyes converge and focus to view the image; thus, the position and shape of the virtual image surface is a function of the physical properties of the light propagating from the waveguide surface toward the user's eyes.

It will be appreciated that other display technologies or configurations may be utilized within an optical engine to display an image to a user in the user's field of view. For example, instead of a projector 1004 and a waveguide, a liquid crystal display (LCD), light emitting diode (LED) array, or other display type may be provided. In some examples, one or more liquid crystal on silicon (LCOS) panels can be used to modulate reflection of light of one or more colors to define individual pixels of the images presented by each display and thereby propagate the colors of light forming the images to various locations across one or more virtual image surfaces. In some examples, one or more LED arrays can be used to emit light of one or more colors from each of an array of LED pixels, thereby propagating the light of one or more colors to various display surface locations. In display types using a conventional 2D screen to present light toward the user's eyes, the virtual image surface can be considered to be identical to the 2D surface of the screen.

In use, a user of the display system 900 will be presented with information, content, and various 3D user interfaces on the near eye displays. The user can then interact with the display system 900 using various input modalities, including the buttons 926, voice inputs or touch inputs on an associated device, and/or hand movements, locations, and positions detected by the display system 900. In some examples, the display system 900 can include additional input devices, such as microphones, touchpads, optical or depth sensors used for gesture recognition, an inertial measurement unit (IMU) used for head motion detection, and so on.

Figure 11:
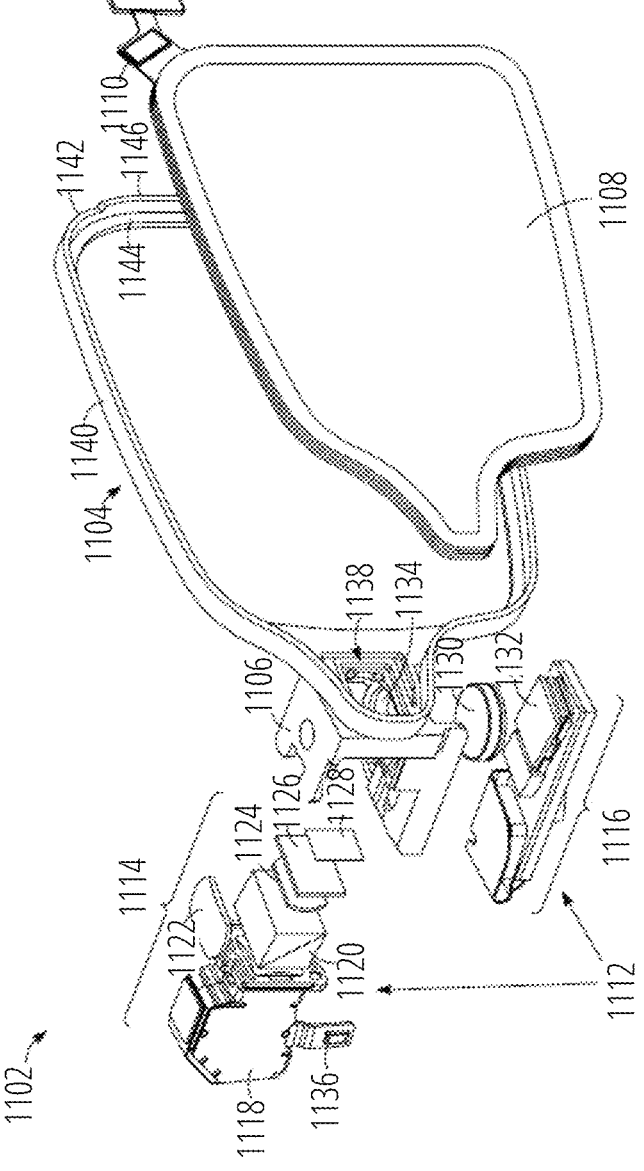
FIG. 11 is an exploded view of an example optical support system of a head-mounted device, illustrating a monocular chassis and its associated components, including a waveguide, projector illumination sub-assembly, and various optical elements such as lenses and beam splitters, in accordance with some examples.

FIG. 11 of the accompanying drawings shows components of an optical support system 1102 in exploded view. The optical support system 1102 includes a monocular chassis 1104 that includes integrated alignment features 1106 described more fully below. The optical support system 1102 further comprises a waveguide 1108. The waveguide 1108 is supported in a waveguide mount 1140. The waveguide mount 1140 may be of ring shape as shown, and in other examples may be provided in, or include, any one or more of a great variety of aesthetic circular, oval, and/or rectangular shapes. For case of assembly, the shapes of the waveguide mount 1140 of the optical support system 1102 can be configured to comport with or accommodate a particular shape of the frame 102 of the display system 100. The waveguide mount 1140 includes features to accommodate and secure the waveguide 1108 including, for example, a waveguide seat 1144 and a peripheral wall 1146, as shown.

In some examples, the waveguide 1108 includes global dimming functionality. To this end, a global dimming connector 1110 is provided. The global dimming connector 1110 is locatable in a connector recess 1142 provided in the waveguide mount 1140. A user wearing the display system 900 can operate a navigation button in some examples to dim the illumination of the augmented content displayed in the display system in a universal or global manner depending on ambient conditions, for example.

The optical support system 1102 includes and supports light projection means. These are shown generally in the illustrated example as the projector system 1112. The projector system 1112 generally includes an illumination sub-assembly 1114 and an imaging sub-assembly 1116.

The illumination sub-assembly 1114 includes an LED projector housing 1118, a polarizing beam splitter (PBS) 1120, and a mirror 1122 mounted in association with the PBS 1120. The LED projector housing 1118 includes a power connector 1136. At an exit side of the PBS 1120, a pupil lens 1124 is provided. A half waveplate 1126 is positioned adjacent to the pupil lens 1124 to assist in processing the light passing through the pupil lens 1124. In some examples, a ghost image absorber 1128 is provided adjacent the pupil lens 1124 to capture stray light or unwanted double images.

The imaging sub-assembly 1116 of the projector system 1112 includes an imaging lens such as a doublet lens 1130 and a display panel such as a Liquid Crystal over Silicon (LCoS) display panel 232. The doublet lens 1130 is received in and positioned by a lens alignment bore 1134 as described more fully below. It will be appreciated that various types of projector may be used in different examples, such as a projector using one or more microLED arrays for providing illumination and/or forming the image, which may eliminate the need for an imaging sub-assembly 316 separate from the illumination sub-assembly 314.

Figure 12:
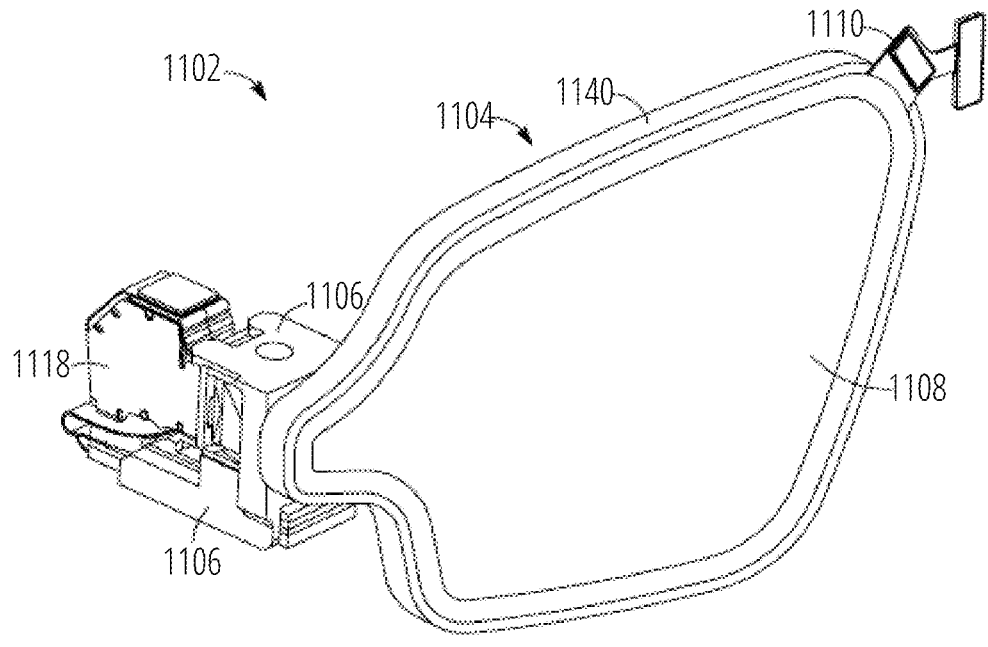
FIG. 12 is an assembled view of the optical support system of FIG. 3, showing the monocular chassis with the optical components mounted in place, in accordance with some examples.
Figure 13:
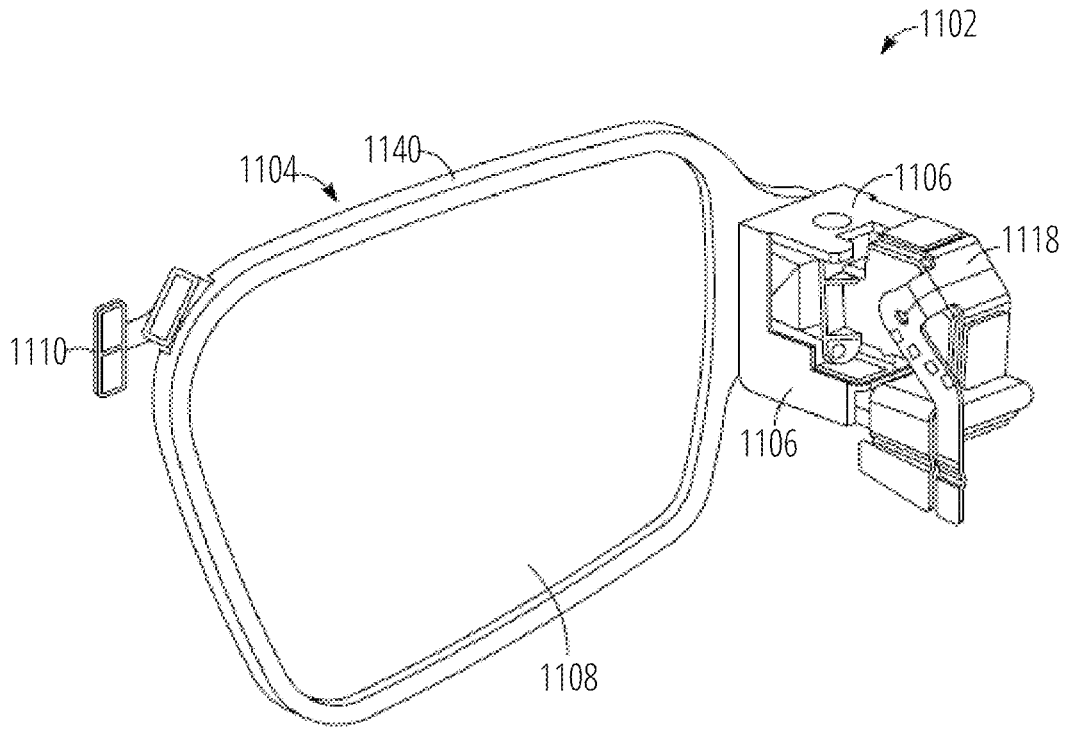
FIG. 13 is another assembled view of the optical support system of FIG. 10, showing a different perspective of the monocular chassis with the optical components mounted in place, in accordance with some examples.

FIG. 12 and FIG. 13 show these components of the optical support system 1102 in assembled form. When assembled, the projector system 312 is positioned such that the projector 204 projects light toward an input diffractive element of the waveguide 308, causing light to be coupled into the waveguide 308 to propagate via total internal reflection (TIR) toward an output diffractive grating, which couples the light out of the eye-facing surface of the waveguide 308 at one or more exit pupils toward a viewer's eye. This cooperation of the projector 204 and waveguide 308 to present an image to the viewer's eye is described below with reference to FIG. 14.

Figure 14:
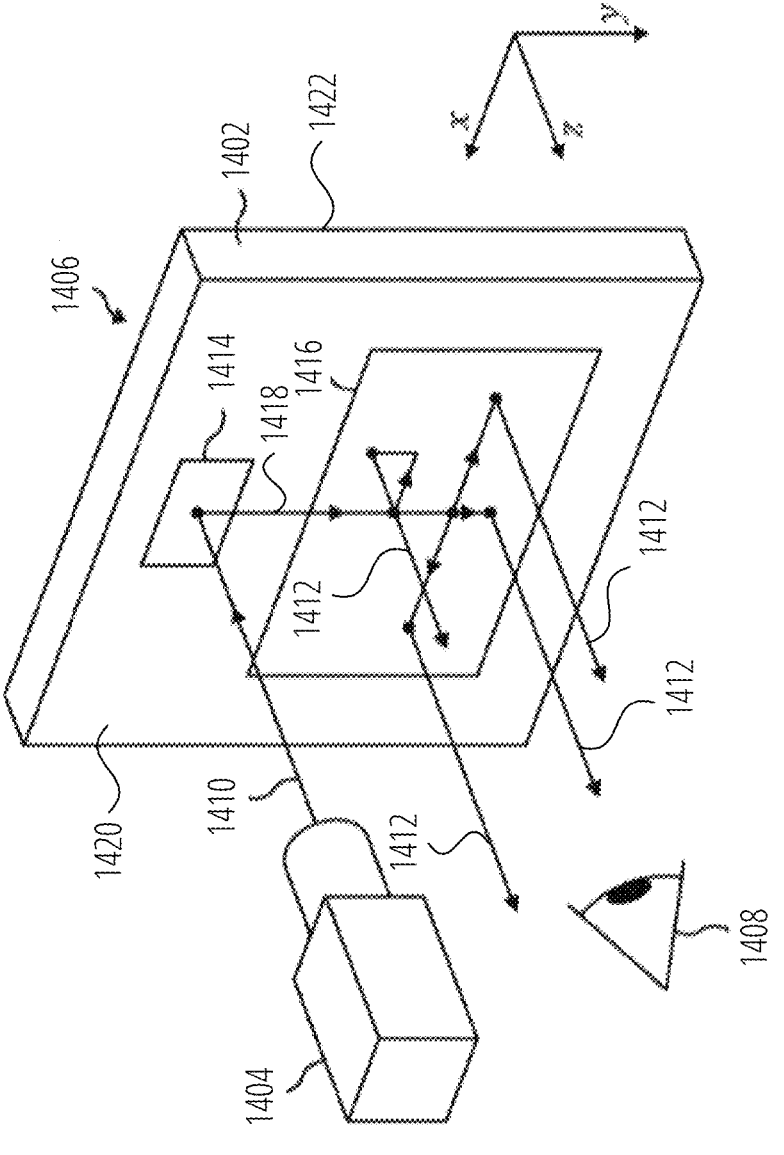
FIG. 14 illustrates a perspective view of a projector and waveguide, showing light propagated toward an eye, in accordance with some examples.

FIG. 14 shows a perspective view of a projector 1404 emitting projected light 1410 (represented in FIG. 14 as a single ray) into a display device 1406. The simplified diagram of FIG. 14 illustrates principles that can be used to implement waveguide-based displays, such as those used by the display system 100.

The display device 1406 includes a waveguide 1402 or light guide. The waveguide 1402 guides light via repeated total internal reflections from opposing surfaces of the waveguide 1402. In the configuration of FIG. 14, the waveguide 1402 can be configured as a planar waveguide or a slab waveguide, such as disposed in the x-y plane. The surfaces can be generally flat or planar surfaces that are parallel to each other and extend in the x-y plane, although in some cases the surface may exhibit curvature. One of the surfaces (e.g., a display surface 1420) can face an eye 1408 of the user. The other of the surfaces (e.g., an opposite surface 1422, also referred to as the world-facing surface) can face away from the eye 1408 of the user.

The waveguide 1402 can include one or more diffractive and/or reflective structures, which can receive the projected light 1410 from the projector 1404, redirect the projected light 1410 internally within the waveguide 1402, and extract the projected light 1410 from the waveguide 1402 to form exiting light 1412. For example, the waveguide 1402 can include one or more diffraction gratings and/or diffraction grating regions, such as a single diffraction grating structure that has individual regions that can function as if they were separate diffraction gratings. The waveguide 1402 can include one or more reflective structures, such as mirrors, prisms, and/or reflective gratings. The waveguide 1402 can include one or more transmissive structures, such as transmissive gratings. The waveguide 1402 can include one or more light-focusing (or collimating-changing) optical elements, such as lenses. Any or all of these structures or elements can be included on one or both surfaces of the waveguide 1402 or in an interior of the waveguide 1402.

In the configuration of FIG. 14, the waveguide 1402 can include an input grating 1414, which can receive the projected light 1410 from the projector 1404 and direct the projected light 1410 into the waveguide 1402 to form light

1418. The waveguide 1402 can include an output grating 1416, which can receive the light 1418, split and redirect the light 1418 internally to extend over a relatively large area (compared to the input grating 1414), and direct the light 1418 out of the waveguide 1402 to form the exiting light 1412. The terms "grating" or "diffraction grating" are used herein to refer to any pattern of diffractive structures or diffractive features. In some examples, the input grating 1414 can be replaced with any component that couples light into the waveguide 1402 such that the light propagates within the waveguide 1402 by total internal reflection. The redirections and splitting can occur from multiple (sequential) interactions with a single diffraction grating, or from sequential interactions with different gratings that are disposed within the surface area of the output grating 1416. For example, a light ray can be diffracted into the waveguide 602 by the input grating 1414 and be caused to totally internally reflect from one surface of the waveguide 1402 to the other in a direction toward the output grating 1416. The light 1418 can then interact with diffractive features of the output grating 1416 on or within the waveguide 602. A portion of light 1418 is diffracted laterally within the plane of the waveguide 602 thereby replicating the image across the area of the output grating 1416, due to multiple interactions with diffractive features that exist across the output grating 1416. Another portion of light 1418 is directed out of the waveguide by diffraction grating 1416 toward the eye 1408 as light 1412. The interactions with the diffractive features of the output grating 1416 can cause internal rays or internal light beams in the waveguide 1402 to change direction within the waveguide 1402. Eventually, the interactions with the diffractive features can cause the internal rays or internal light beams to exit the waveguide 1402 to propagate toward the eye 1408 of the user.

In some examples, the waveguide 1402 can be configured to operate at infinite conjugates. For example, the projector 1404 can project light that forms an image infinitely far away, so that the light would appear in focus on a screen placed relatively far from the projector 1404. Similarly, the output grating 1416 can direct the exiting light 1412 toward the eye in such a manner that the image appears to be infinitely far away to the eye 1408 of the user. For such an infinite-conjugate arrangement, angles in the space of the light that enters and exits the waveguide 1402 can correspond uniquely to image locations in the image. For example, the propagation angles of the light can map uniquely to the propagation angles of the exiting light 1412, which in turn can map uniquely to the image locations in the image at the retina of the eye 1408 of the user.

The waveguide 1402 can make use of this infinite-conjugate relationship to perform so-called "pupil replication" or "pupil expansion". The projector 1404 can be configured to have an exit pupil that coincides with the input grating 1414. The internal splitting and redirections within the output grating 1416 can effectively expand a surface area of the exit pupil, while maintaining the unique mapping of propagation angle to image location for light in the pupil, and thereby maintaining the unique mapping of virtual image surface location to image location. The size of the output grating 1416 (e.g., an area covered by the replicated pupils, as constrained within a surface area of the output grating 1416) can be larger than a pupil of the eye 1408 of the user, so that if the pupil of the eye 1408 moves, such as caused by the user changing a gaze direction, the amount of light entering the pupil of the eye 1408 may not vary significantly, and the user may not perceive a change in brightness of the image.

Networked Computing Environment

Figure 15:
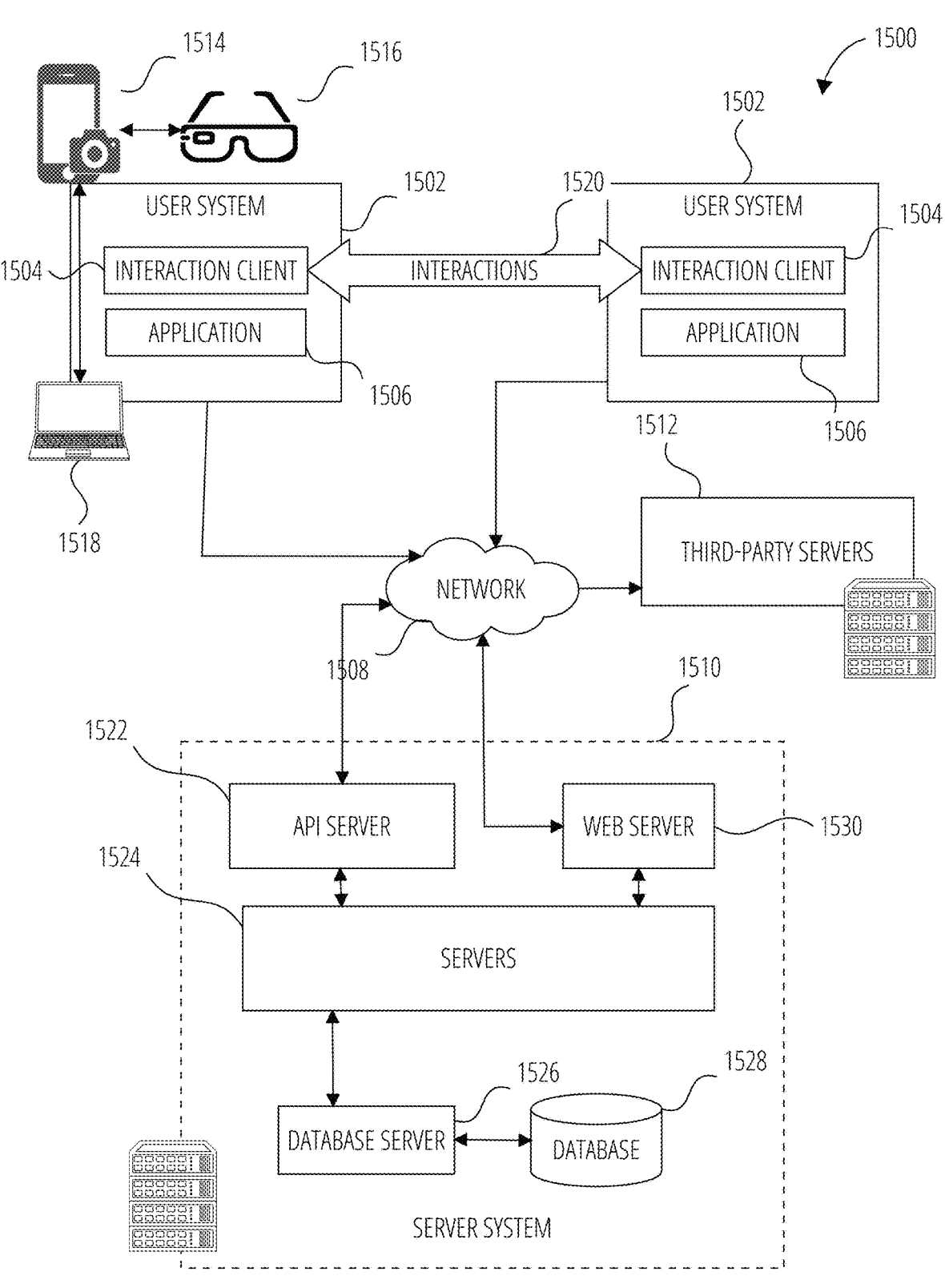
FIG. 15 is a diagrammatic representation of a networked environment in which the present disclosure may be deployed, according to some examples.

FIG. 15 is a block diagram showing an example digital interaction system 1500 for facilitating interactions and engagements (e.g., exchanging text messages, conducting text audio and video calls, or playing games) over a network. The digital interaction system 1500 includes multiple user systems 1502, each of which hosts multiple applications, including an interaction client 1504 and other applications 1506. Each interaction client 1504 is communicatively coupled, via one or more networks including a Network 1508 (e.g., the Internet), to other instances of the interaction client 1504 (e.g., hosted on respective other user systems 102), a server system 1510 and third-party servers 1512). An interaction client 1504 can also communicate with locally hosted applications 1506 using Applications Program Interfaces (APIs).

Each user system 1502 may include multiple user devices, such as a mobile device 1514, head-wearable apparatus 1516 (such as display system 900), and a computer client device 1518 that are communicatively connected to exchange data and messages.

An interaction client 1504 interacts with other interaction clients 1504 and with the server system 1510 via the Network 1508. The data exchanged between the interaction clients 1504 (e.g., interactions 1520) and between the interaction clients 1504 and the server system 1510 includes functions (e.g., commands to invoke functions) and payload data (e.g., text, audio, video, or other multimedia data).

The server system 1510 provides server-side functionality via the Network 1508 to the interaction clients 1504. While certain functions of the digital interaction system 1500 are described herein as being performed by either an interaction client 1504 or by the server system 1510, the location of certain functionality either within the interaction client 1504 or the server system 1510 may be a design choice. For example, it may be technically preferable to initially deploy particular technology and functionality within the server system 1510 but to later migrate this technology and functionality to the interaction client 1504 where a user system 1502 has sufficient processing capacity.

The server system 1510 supports various services and operations that are provided to the interaction clients 1504. Such operations include transmitting data to, receiving data from, and processing data generated by the interaction clients 1504. This data may include message content, client device information, geolocation information, digital effects (e.g., media augmentation and overlays), message content persistence conditions, entity relationship information, and live event information. Data exchanges within the digital interaction system 1500 are invoked and controlled through functions available via user interfaces (UIs) of the interaction clients 1504.

Turning now specifically to the server system 1510, an Application Program Interface (API) server 1522 is coupled to and provides programmatic interfaces to servers 1524, making the functions of the servers 1524 accessible to interaction clients 1504, other applications 1506 and third-party server 1512. The servers 1524 are communicatively coupled to a database server 1526, facilitating access to a database 1528 that stores data associated with interactions processed by the servers 1524. Similarly, a web server 1530 is coupled to the servers 1524 and provides web-based interfaces to the servers 1524. To this end, the web server 1530 processes incoming network requests over the Hypertext Transfer Protocol (HTTP) and several other related protocols.

The Application Program Interface (API) server 1522 receives and transmits interaction data (e.g., commands and message payloads) between the servers 1524 and the user systems 1502 (and, for example, interaction clients 1504 and other application 1506) and the third-party server 1512. Specifically, the Application Program Interface (API) server 1522 provides a set of interfaces (e.g., routines and protocols) that can be called or queried by the interaction client 1504 and other applications 1506 to invoke functionality of the servers 1524. The Application Program Interface (API) server 1522 exposes various functions supported by the servers 1524, including account registration; login functionality; the sending of interaction data, via the servers 1524, from a particular interaction client 1504 to another interaction client 1504; the communication of media files (e.g., images or video) from an interaction client 1504 to the servers 1524; the settings of a collection of media data (e.g., a narrative); the retrieval of a list of friends of a user of a user system 1502; the retrieval of messages and content; the addition and deletion of entities (e.g., friends) to an entity relationship graph; the location of friends within an entity relationship graph; and opening an application event (e.g., relating to the interaction client 1504).

The servers 1524 host multiple systems and subsystems, described below with reference to FIG. 16.

External Recourses and Linked Applications

The interaction client 1504 provides a user interface that allows users to access features and functions of an external resource, such as a linked application 1506, an applet, or a microservice. This external resource may be provided by a third party or by the creator of the interaction client 1504.

The external resource may be a full-scale application installed on the user's system 1502, or a smaller, lightweight version of the application, such as an applet or a microservice, hosted either on the user's system or remotely, such as on third-party servers 1512 or in the cloud. These smaller versions, which include a subset of the full application's features, may be implemented using a markup-language document and may also incorporate a scripting language and a style sheet.

When a user selects an option to launch or access the external resource, the interaction client 1504 determines whether the resource is web-based or a locally installed application. Locally installed applications can be launched independently of the interaction client 1504, while applets and microservices can be launched or accessed via the interaction client 1504.

If the external resource is a locally installed application, the interaction client 1504 instructs the user's system to launch the resource by executing locally stored code. If the resource is web-based, the interaction client 1504 communicates with third-party servers to obtain a markup-language document corresponding to the selected resource, which it then processes to present the resource within its user interface.

The interaction client 1504 can also notify users of activity in one or more external resources. For instance, it can provide notifications relating to the use of an external resource by one or more members of a user group. Users can be invited to join an active external resource or to launch a recently used but currently inactive resource.

The interaction client 1504 can present a list of available external resources to a user, allowing them to launch or access a given resource. This list can be presented in a context-sensitive menu, with icons representing different applications, applets, or microservices varying based on how the menu is launched by the user.

System Architecture

Figure 16:
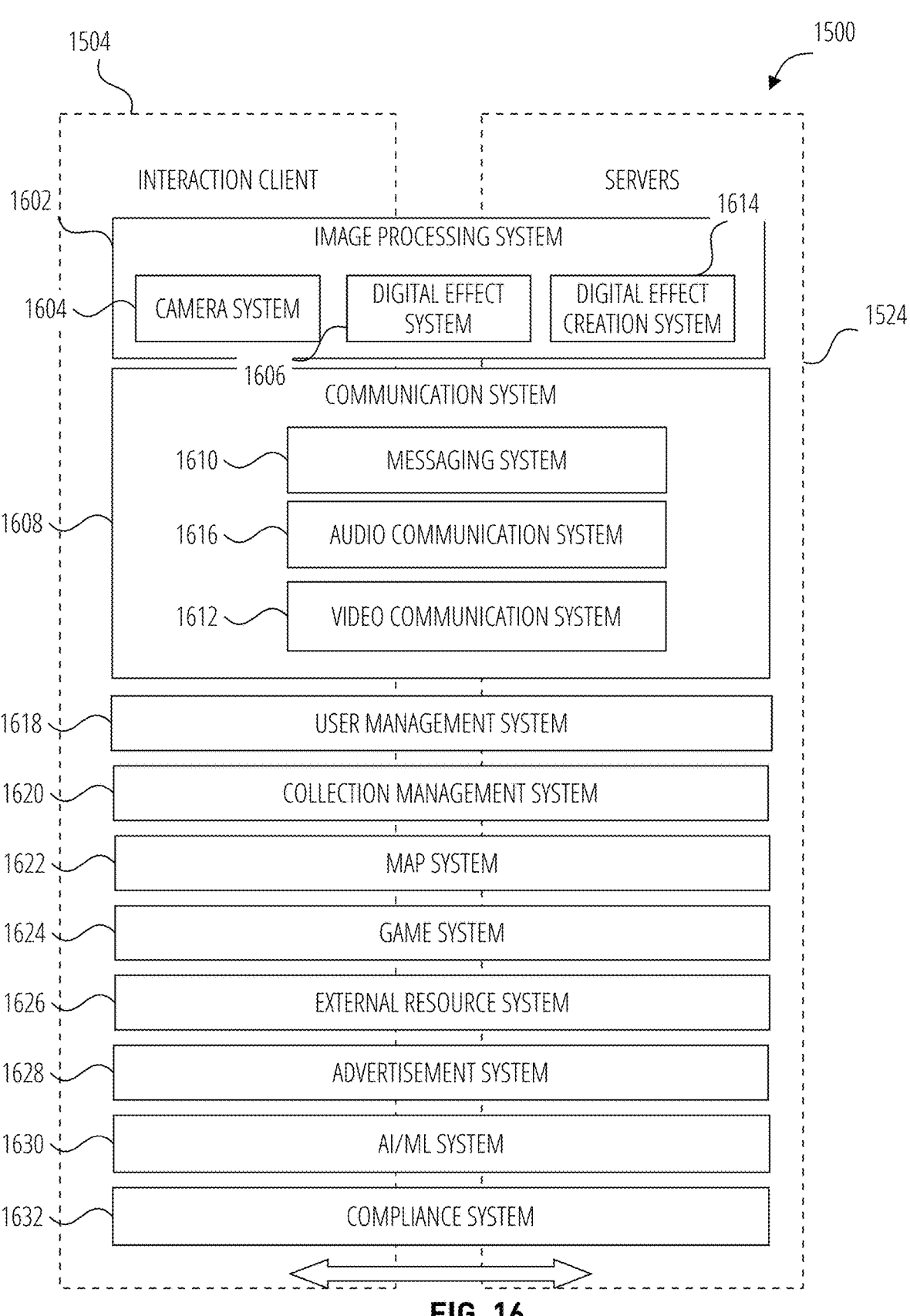
FIG. 16 is a diagrammatic representation of a digital interaction system that has both client-side and server-side functionality, according to some examples.

FIG. 16 is a block diagram illustrating further details regarding the digital interaction system 1500, according to some examples. Specifically, the digital interaction system 1500 is shown to comprise the interaction client 1504 and the servers 1524. The digital interaction system 1500 embodies multiple subsystems, which are supported on the client-side by the interaction client 1504 and on the server-side by the servers 1524. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 1500.

Data storage: A microservice subsystem may be responsible for its own data storage, which may be in the form of a database, cache, or other storage mechanism (e.g., using the database server 1526 and database 1528). This enables a microservice subsystem to operate independently of other microservices of the digital interaction system 1500.

Service discovery: Microservice subsystems may find and communicate with other microservice subsystems of the digital interaction system 1500. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable the tracking of health and performance of a microservice subsystem.

In some examples, the digital interaction system 1500 may employ a monolithic architecture, a service-oriented architecture (SOA), a function-as-a-service (FaaS) architecture, or a modular architecture:

Example subsystems are discussed below.

An image processing system 1602 provides various functions that enable a user to capture and modify (e.g., augment, annotate or otherwise edit) media content associated with a message.

A camera system 1604 includes control software (e.g., in a camera application) that interacts with and controls hardware camera hardware (e.g., directly or via operating system controls) of the user system 1502 to modify real-time images captured and displayed via the interaction client 1504.

The digital effect system 1606 provides functions related to the generation and publishing of digital effects (e.g., media overlays) for images captured in real-time by cameras of the user system 1502 or retrieved from memory of the user system 1502. For example, the digital effect system 1606 operatively selects, presents, and displays digital effects (e.g., media overlays such as image filters or modifications) to the interaction client 1504 for the modification of real-time images received via the camera system 1604 or stored images retrieved from memory 1702 of a user system

1502. These digital effects are selected by the digital effect system 1606 and presented to a user of an interaction client 1504, based on a number of inputs and data, such as for example:

Geolocation of the user system 1502; and

Entity relationship information of the user of the user system 1502.

Digital effects may include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 1502 for communication in a message, or applied to video content, such as a video content stream or feed transmitted from an interaction client 1504. As such, the image processing system 1602 may interact with, and support, the various subsystems of the communication system 1608, such as the messaging system 1610 and the video communication system 1612.

A media overlay may include text or image data that can be overlaid on top of a photograph taken by the user system 1502 or a video stream produced by the user system 1502. In some examples, the media overlay may be a location overlay (e.g., Venice beach), a name of a live event, or a name of a merchant overlay (e.g., Beach Coffee House). In further examples, the image processing system 1602 uses the geolocation of the user system 1502 to identify a media overlay that includes the name of a merchant at the geolocation of the user system 1502. The media overlay may include other indicia associated with the merchant. The media overlays may be stored in the databases 1528 and accessed through the database server 1526.

The image processing system 1602 provides a user-based publication platform that enables users to select a geolocation on a map and upload content associated with the selected geolocation. The user may also specify circumstances under which a particular media overlay should be offered to other users. The image processing system 1602 generates a media overlay that includes the uploaded content and associates the uploaded content with the selected geolocation.

The digital effect creation system 1614 supports augmented reality developer platforms and includes an application for content creators (e.g., artists and developers) to create and publish digital effects (e.g., augmented reality experiences) of the interaction client 1504. The digital effect creation system 1614 provides a library of built-in features and tools to content creators including, for example custom shaders, tracking technology, and templates.

In some examples, the digital effect creation system 1614 provides a merchant-based publication platform that enables merchants to select a particular digital effect associated with a geolocation via a bidding process. For example, the digital effect creation system 1614 associates a media overlay of the highest bidding merchant with a corresponding geolocation for a predefined amount of time.

In some examples, the digital effect creation system 1614 can include the 4D scene generation system 104 as described above. The 4D scene generation system 104 can be used to generate a 4D scene model 110 based on inputs received from various components of a digital interaction system 1500, such as text data, image data, pre-existing video data, or video data captured by the camera system 1604. In some examples, the 4D scene generation system 104 can be implemented by other systems of the image processing system 1602, the digital interaction system 1500, or other components of a computing system.

The 4D scene generation system 104, or components thereof, can also be used to generate views of a 4D scene using the generated 4D scene model 110. For example, the 4D scene generation system 104 can use the trained 4D scene model 110 to dynamically generate views of a scene for use as visual overlays or videos in an XR system as described above. It will be appreciated that the 4D scene generation system 104 can generate a 4D scene model 110, and/or generate interactive or non-interactive content based on a trained 4D scene model 110, for use by (or using inputs from) one or more other subsystems or components of the systems or devices described herein, such as the game system 1624, the image processing system 1602, the digital effect system 1606, and so on.

A communication system 1608 is responsible for enabling and processing multiple forms of communication and interaction within the digital interaction system 1500 and includes a messaging system 1610, an audio communication system 1616, and a video communication system 1612. The messaging system 1610 is responsible, in some examples, for enforcing the temporary or time-limited access to content by the interaction clients 1504. The messaging system 1610 incorporates multiple timers that, based on duration and display parameters associated with a message or collection of messages (e.g., a narrative), selectively enable access (e.g., for presentation and display) to messages and associated content via the interaction client 1504. The audio communication system 1616 enables and supports audio communications (e.g., real-time audio chat) between multiple interaction clients 1504. Similarly, the video communication system 1612 enables and supports video communications (e.g., real-time video chat) between multiple interaction clients 1504.

A user management system 1618 is operationally responsible for the management of user data and profiles, and maintains entity information regarding users and relationships between users of the digital interaction system 1500.

A collection management system 220 is operationally responsible for managing sets or collections of media (e.g., collections of text, image video, and audio data). A collection of content (e.g., messages, including images, video, text, and audio) may be organized into an "event gallery" or an "event collection." Such a collection may be made available for a specified time period, such as the duration of an event to which the content relates. For example, content relating to a music concert may be made available as a "concert collection" for the duration of that music concert. The collection management system 1620 may also be responsible for publishing an icon that provides notification of a particular collection to the user interface of the interaction client 1504. The collection management system 1620 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1620 employs machine vision (or image recognition technology) and content rules to curate a content collection automatically. In certain examples, compensation may be paid to a user to include user-generated content into a collection. In such cases, the collection management system 1620 operates to automatically make payments to such users to use their content.

A map system 1622 provides various geographic location (e.g., geolocation) functions and supports the presentation of map-based media content and messages by the interaction client 1504. For example, the map system 1622 enables the display of user icons or avatars on a map to indicate a current or past location of "friends" of a user, as well as media content (e.g., collections of messages including photographs and videos) generated by such friends, within the context of a map. For example, a message posted by a user to the digital interaction system 1500 from a specific geographic location may be displayed within the context of a map at that particular location to "friends" of a specific user on a map interface of the interaction client 1504. A user can furthermore share his or her location and status information (e.g., using an appropriate status avatar) with other users of the digital interaction system 1500 via the interaction client 1504, with this location and status information being similarly displayed within the context of a map interface of the interaction client 1504 to selected users.

A game system 1624 provides various gaming functions within the context of the interaction client 1504. The interaction client 1504 provides a game interface providing a list of available games that can be launched by a user within the context of the interaction client 1504 and played with other users of the digital interaction system 1500. The digital interaction system 1500 further enables a particular user to invite other users to participate in the play of a specific game by issuing invitations to such other users from the interaction client 1504. The interaction client 1504 also supports audio, video, and text messaging (e.g., chats) within the context of gameplay, provides a leaderboard for the games, and supports the provision of in-game rewards (e.g., coins and items).

An external resource system 1626 provides an interface for the interaction client 1504 to communicate with remote servers (e.g., third-party servers 1512) to launch or access external resources, i.e., applications or applets. Each third-party server 1512 hosts, for example, a markup language (e.g., HTML5) based application or a small-scale version of an application (e.g., game, utility, payment, or ride-sharing application). The interaction client 1504 may launch a web-based resource (e.g., application) by accessing the HTML5 file from the third-party servers 1512 associated with the web-based resource. Applications hosted by third-party servers 1512 are programmed in JavaScript leveraging a Software Development Kit (SDK) provided by the servers 1524. The SDK includes Application Programming Interfaces (APIs) with functions that can be called or invoked by the web-based application. The servers 1524 host a JavaScript library that provides a given external resource access to specific user data of the interaction client 1504. HTML5 is an example of technology for programming games, but applications and resources programmed based on other technologies can be used.

To integrate the functions of the SDK into the web-based resource, the SDK is downloaded by the third-party server 1512 from the servers 1524 or is otherwise received by the third-party server 1512. Once downloaded or received, the SDK is included as part of the application code of a web-based external resource. The code of the web-based resource can then call or invoke certain functions of the SDK to integrate features of the interaction client 1504 into the web-based resource.

The SDK stored on the server system 1510 effectively provides the bridge between an external resource (e.g., applications 1506 or applets) and the interaction client 1504. This gives the user a seamless experience of communicating with other users on the interaction client 1504 while also preserving the look and feel of the interaction client 1504. To bridge communications between an external resource and an interaction client 1504, the SDK facilitates communication between third-party servers 1512 and the interaction client 1504. A bridge script running on a user system 1502 establishes two one-way communication channels between an external resource and the interaction client 1504. Messages are sent between the external resource and the interaction client 1504 via these communication channels asynchronously. Each SDK function invocation is sent as a message and callback. Each SDK function is implemented by constructing a unique callback identifier and sending a message with that callback identifier.

By using the SDK, not all information from the interaction client 1504 is shared with third-party servers 1512. The SDK limits which information is shared based on the needs of the external resource. Each third-party server 1512 provides an HTML5 file corresponding to the web-based external resource to servers 1524. The servers 1524 can add a visual representation (such as a box art or other graphic) of the web-based external resource in the interaction client 1504. Once the user selects the visual representation or instructs the interaction client 1504 through a GUI of the interaction client 1504 to access features of the web-based external resource, the interaction client 1504 obtains the HTML5 file and instantiates the resources to access the features of the web-based external resource.

The interaction client 1504 presents a graphical user interface (e.g., a landing page or title screen) for an external resource. During, before, or after presenting the landing page or title screen, the interaction client 1504 determines whether the launched external resource has been previously authorized to access user data of the interaction client 1504. In response to determining that the launched external resource has been previously authorized to access user data of the interaction client 1504, the interaction client 1504 presents another graphical user interface of the external resource that includes functions and features of the external resource. In response to determining that the launched external resource has not been previously authorized to access user data of the interaction client 1504, after a threshold period of time (e.g., 3 seconds) of displaying the landing page or title screen of the external resource, the interaction client 1504 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 1504 adds the external resource to a list of authorized external resources and allows the external resource to access user data from the interaction client 1504. The external resource is authorized by the interaction client 1504 to access the user data under an OAuth 2 framework.

The interaction client 1504 controls the type of user data that is shared with external resources based on the type of external resource being authorized. For example, external resources that include full-scale applications (e.g., an application 1506) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1628 operationally enables the purchasing of advertisements by third parties for presentation to end-users via the interaction clients 1504 and handles the delivery and presentation of these advertisements.

An artificial intelligence and machine learning system 1630 provides a variety of services to different subsystems within the digital interaction system 1500. For example, the artificial intelligence and machine learning system 1630 operates with the image processing system 1602 and the camera system 1604 to analyze images and extract information such as objects, text, or faces. This information can then be used by the image processing system 1602 to enhance, filter, or manipulate images. The artificial intelligence and machine learning system 1630 may be used by the digital effect system 1606 to generate modified content and augmented reality experiences, such as adding virtual objects or animations to real-world images. The communication system 1608 and messaging system 1610 may use the artificial intelligence and machine learning system 1630 to analyze communication patterns and provide insights into how users interact with each other and provide intelligent message classification and tagging, such as categorizing messages based on sentiment or topic. The artificial intelligence and machine learning system 1630 may also provide chatbot functionality to message interactions 1520 between user systems 1502 and between a user system 1502 and the server system 1510. The artificial intelligence and machine learning system 1630 may also work with the audio communication system 1616 to provide speech recognition and natural language processing capabilities, allowing users to interact with the digital interaction system 1500 using voice commands. In some examples, the 1630 provides some or all of the model training and/or model inference functionality of the 4D scene generation system 104.

A compliance system 1632 facilitates compliance by the digital interaction system 1500 with data privacy and other regulations, including for example the California Consumer Privacy Act (CCPA), General Data Protection Regulation (GDPR), and Digital Services Act (DSA). The compliance system 1632 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 1632 also incorporates opt-in/opt-out management and privacy controls across the digital interaction system 1500, empowering users to manage their data preferences. The compliance system 1632 is designed to handle sensitive data by obtaining explicit consent, implementing strict access controls and in accordance with applicable laws.

System with Head-Wearable Apparatus

Figure 17:
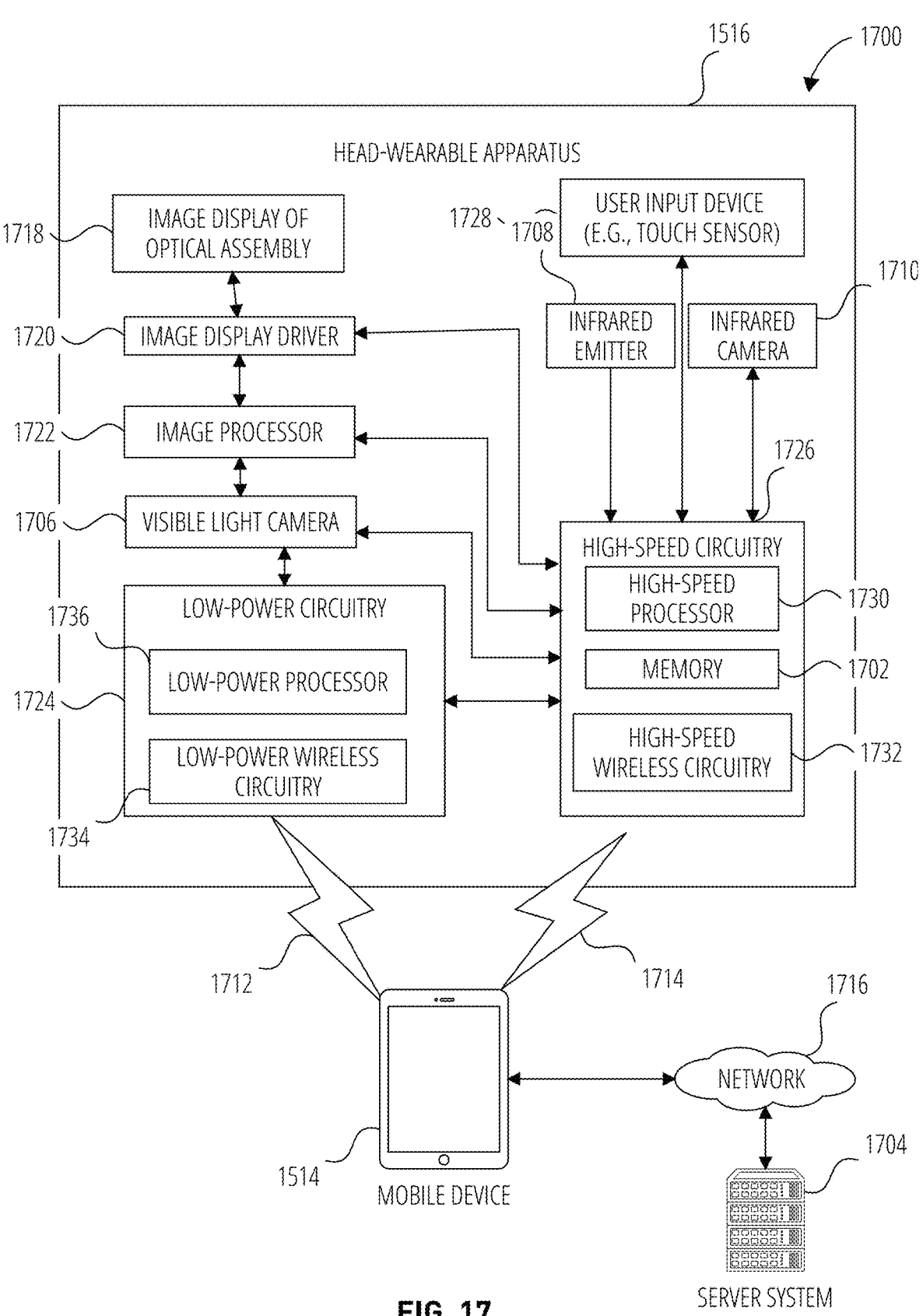
FIG. 17 illustrates a system in which the head-wearable apparatus, according to some examples.

FIG. 17 illustrates a system 1700 including a head-wearable apparatus 1516 with a selector input device, according to some examples. FIG. 17 is a high-level functional block diagram of an example head-wearable apparatus

1516 communicatively coupled to a mobile device 1514 and various server systems 1704 (e.g., the server system 1510) via various Networks 1508.

The head-wearable apparatus 1516 includes one or more cameras, each of which may be, for example, a visible light camera 1706, an infrared emitter 1708, and an infrared camera 1710.

The mobile device 1514 connects with head-wearable apparatus 1516 using both a low-power wireless connection 1712 and a high-speed wireless connection 1714. The mobile device 1514 is also connected to the server system 1704 and the Network 1716.

The head-wearable apparatus 1516 further includes two image displays of the image display of optical assembly 1718. The two image displays of optical assembly 1718 include one associated with the left lateral side and one associated with the right lateral side of the head-wearable apparatus 1516. The head-wearable apparatus 1516 also includes an image display driver 1720, an image Processor 1722, low-power circuitry 1724, and high-speed circuitry 1726. The image display of optical assembly 1718 is for presenting images and videos, including an image that can include a graphical user interface to a user of the head-wearable apparatus 1516.

The image display driver 1720 commands and controls the image display of optical assembly 1718. The image display driver 1720 may deliver image data directly to the image display of optical assembly 1718 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 1516 includes a frame and stems (or temples) extending from a lateral side of the frame. The head-wearable apparatus 1516 further includes a user input device 1728 (e.g., touch sensor or push button), including an input surface on the head-wearable apparatus 1516. The user input device 1728 (e.g., touch sensor or push button) is to receive from the user an input selection to manipulate the graphical user interface of the presented image.

The components shown in FIG. 17 for the head-wearable apparatus 1516 are located on one or more circuit boards, for example a PCB or flexible PCB, in the rims or temples. Alternatively, or additionally, the depicted components can be located in the chunks, frames, hinges, or bridge of the head-wearable apparatus 1516. Left and right visible light cameras 1706 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 1516 includes a memory 1702, which stores instructions to perform a subset, or all the functions described herein. The memory 1702 can also include storage device.

As shown in FIG. 17, the high-speed circuitry 1726 includes a high-speed Processor 1730, a memory 1702, and high-speed wireless circuitry 1732. In some examples, the image display driver 1720 is coupled to the high-speed circuitry 1726 and operated by the high-speed Processor 1730 to drive the left and right image displays of the image display of optical assembly 1718. The high-speed Processor 1730 may be any processor capable of managing high-speed communications and operation of any general computing system needed for the head-wearable apparatus 1516. The high-speed Processor 1730 includes processing resources needed for managing high-speed data transfers on a high-speed wireless connection 1714 to a wireless local area network (WLAN) using the high-speed wireless circuitry 1732. In certain examples, the high-speed Processor 1730 executes an operating system such as a LINUX operating system or other such operating system of the head-wearable apparatus 1516, and the operating system is stored in the memory 1702 for execution. In addition to any other responsibilities, the high-speed Processor 1730 executing a software architecture for the head-wearable apparatus 1516 is used to manage data transfers with high-speed wireless circuitry 1732. In certain examples, the high-speed wireless circuitry 1732 is configured to implement Institute of Electrical and Electronic Engineers (IEEE) 802.11 communication standards, also referred to herein as WI-FI®. In some examples, other high-speed communications standards may be implemented by the high-speed wireless circuitry 1732.

The low-power wireless circuitry 1734 and the high-speed wireless circuitry 1732 of the head-wearable apparatus 1516 can include short-range transceivers (e.g., Bluetooth™, Bluetooth LE, Zigbee, ANT+) and wireless wide, local, or wide area Network transceivers (e.g., cellular or WI-FI®). Mobile device 1514, including the transceivers communicating via the low-power wireless connection 1712 and the high-speed wireless connection 1714, may be implemented using details of the architecture of the head-wearable apparatus 1516, as can other elements of the Network 1716.

The memory 1702 includes any storage device capable of storing various data and applications, including, among other things, camera data generated by the left and right visible light cameras 1706, the infrared camera 1710, and the image Processor 1722, as well as images generated for display by the image display driver 1720 on the image displays of the image display of optical assembly 1718. While the memory 1702 is shown as integrated with high-speed circuitry 1726, in some examples, the memory 1702 may be an independent standalone element of the head-wearable apparatus 1516. In certain such examples, electrical routing lines may provide a connection through a chip that includes the high-speed Processor 1730 from the image Processor 1722 or the low-power Processor 1736 to the memory 1702. In some examples, the high-speed Processor 1730 may manage addressing of the memory 1702 such that the low-power Processor 1736 will boot the high-speed Processor 1730 any time that a read or write operation involving memory 1702 is needed.

As shown in FIG. 17, the low-power Processor 1736 or high-speed Processor 1730 of the head-wearable apparatus 1516 can be coupled to the camera (visible light camera 1706, infrared emitter 1708, or infrared camera 1710), the image display driver 1720, the user input device 1728 (e.g., touch sensor or push button), and the memory 1702.

The head-wearable apparatus 1516 is connected to a host computer. For example, the head-wearable apparatus 1516 is paired with the mobile device 1514 via the high-speed wireless connection 1714 or connected to the server system 1704 via the Network 1716. The server system 1704 may be one or more computing devices as part of a service or network computing system, for example, that includes a processor, a memory, and network communication interface to communicate over the Network 1716 with the mobile device 1514 and the head-wearable apparatus 1516.

The mobile device 1514 includes a processor and a Network communication interface coupled to the processor. The Network communication interface allows for communication over the Network 1716, low-power wireless connection 1712, or high-speed wireless connection 1714. Mobile device 1514 can further store at least portions of the instructions in the memory of the mobile device 1514 memory to implement the functionality described herein.

Output components of the head-wearable apparatus 1516 include visual components, such as a display such as a liquid crystal display (LCD), a plasma display panel (PDP), a light-emitting diode (LED) display, a projector, or a waveguide. The image displays of the optical assembly are driven by the image display driver 1720. The output components of the head-wearable apparatus 1516 further include acoustic components (e.g., speakers), haptic components (e.g., a vibratory motor), other signal generators, and so forth. The input components of the head-wearable apparatus 1516, the mobile device 1514, and server system 1704, such as the user input device 1728, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1516 may also include additional peripheral device elements. Such peripheral device elements may include sensors and display elements integrated with the head-wearable apparatus 1516. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1712 and high-speed wireless connection 1714 from the mobile device 1514 via the low-power wireless circuitry 1734 or high-speed wireless circuitry 1732.

Machine Architecture

Figure 18:
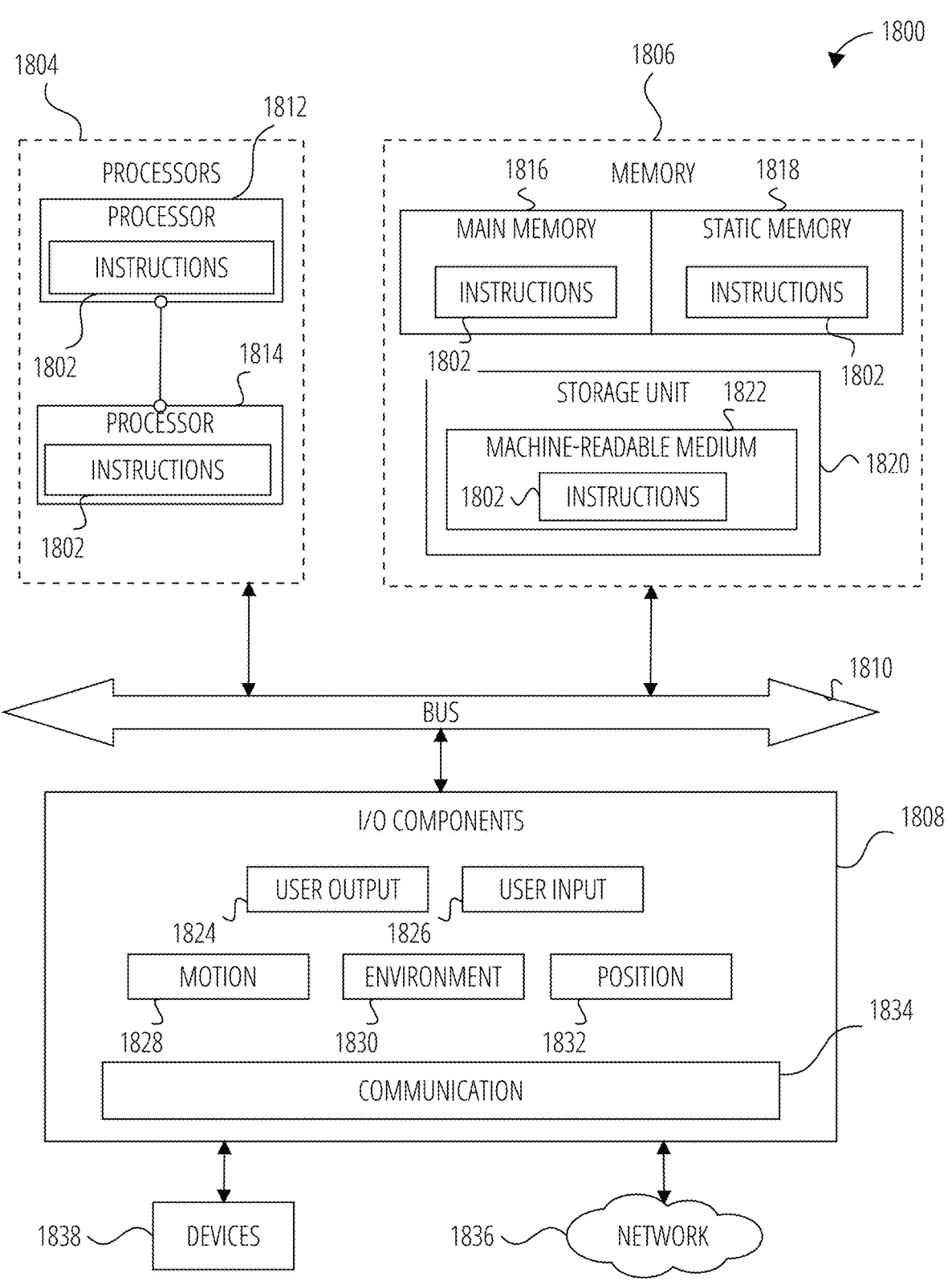
FIG. 18 is a diagrammatic representation of a machine in the form of a computer system within which a set of instructions may be executed to cause the machine to perform any one or more of the methodologies discussed herein, in accordance with some examples.

FIG. 18 is a diagrammatic representation of a machine 1800 within which instructions 1802 (e.g., software, a program, an application, an applet, an app, or other executable code) for causing the machine 1800 to perform any one or more of the methodologies discussed herein may be executed. For example, the instructions 1802 can cause the machine 1800 to implement and control the display system 900 described above. The instructions 1802 transform the general, non-programmed machine 1800 into a particular machine 1800 programmed to carry out the described and illustrated functions in the manner described. The machine 1800 can operate as a standalone device or can be coupled (e.g., networked) to other machines. In a networked deployment, the machine 1800 can operate in the capacity of a server machine or a client machine in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1802, sequentially or otherwise, that specify actions to be taken by the machine 1800. Further, while a single machine 1800 is illustrated, the term "machine" shall also be taken to include a collection or system of machines that individually or jointly execute the instructions 1802 to perform any one or more of the methodologies discussed herein. In some examples, the machine 1800 can comprise both client and server systems, with certain operations of a particular method or algorithm being performed on the server-side and with certain operations of the particular method or algorithm being performed on the client-side.

The machine 1800 can include processors 1804, memory 1806, and input/output I/O components 1808, which can be configured to communicate with each other via a bus 1810. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, a processor 1812 and a processor 1814 that execute the instructions 1802. The term "processor" is intended to include multi-core processors that can comprise two or more independent processors (sometimes referred to as "cores") that can execute instructions contemporaneously. Although FIG. 18 shows multiple processors 1804, the machine 1800 can include a single processor with a single-core, a single processor with multiple cores (e.g., a multi-core processor), multiple processors with a single core, multiple processors with multiples cores, or any combination thereof.

The memory 1806 includes a main memory 1816, a static memory 1818, and a storage unit 1820, all accessible to the processors 1804 via the bus 1810. The main memory 1806, the static memory 1818, and the storage unit 1820 store the instructions 1802 embodying any one or more of the methodologies or functions described herein. The instructions 1802 can also reside, completely or partially, within the main memory 1816, within the static memory 1818, within machine-readable medium 1822 within the storage unit 1820, within at least one of the processors 1804 (e.g., within the processor's cache memory), or any suitable combination thereof, during execution thereof by the machine 1800.

The I/O components 1808 can include a wide variety of components to receive input, provide output, produce output, transmit information, exchange information, capture measurements, and so on. The specific I/O components 1808 that are included in a particular machine will depend on the type of machine. For example, portable machines such as mobile phones can include a touch input device or other such input mechanisms, while a headless server machine will likely not include such a touch input device. It will be appreciated that the I/O components 1808 can include many other components that are not shown in FIG. 18. In various examples, the I/O components 1808 can include user output components 1824 and user input components 1826. The user output components 1824 can include or communicate with visual components (e.g., one or more displays such as the left near-eye display and right near-eye display, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1808 can include motion components 1828, environmental components 1830, or position components 1832, among a wide array of other components.

The motion components 1828 include acceleration sensor components (e.g., accelerometer), gravitation sensor components, rotation sensor components (e.g., gyroscope).

The environmental components 1830 include, for example, one or more externally-facing cameras (with still image/photograph and video capabilities) such as left camera 914 and right camera 916, illumination sensor components (e.g., photometer or ambient light sensor), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that can provide indications, measurements, or signals corresponding to a surrounding physical environment.

Further, the camera system of the machine 1800 can include dual rear cameras (e.g., a primary camera as well as a depth-sensing camera), or even triple, quad or penta rear camera configurations on the front and rear sides of the machine 1800. These multiple cameras systems can include a wide camera, an ultra-wide camera, a telephoto camera, a macro camera, and a depth sensor, for example. In some examples, one or more of the cameras can be used as an ambient light sensor.

The position components 1832 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1808 further include communication components 1834 operable to couple the machine 1800 to a network 1836 or devices 1838 via respective coupling or connections. For example, the communication components 1834 can include a network interface component or another suitable device to interface with the network 1836. In further examples, the communication components 1834 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1838 can be another machine or any of a wide variety of peripheral devices (e.g., a peripheral device coupled via a USB).

Moreover, the communication components 1834 can detect identifiers or include components operable to detect identifiers. For example, the communication components 1834 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information can be derived via the communication components 1834, such as location via Internet Protocol (IP) geolocation, location via Wi-Fi® signal triangulation, location via detecting an NFC beacon signal that can indicate a particular location, and so forth.

The various memories (e.g., main memory 1816, static memory 1818, and memory of the processors 1804) and storage unit 1820 can store one or more sets of instructions and data structures (e.g., software) embodying or used by any one or more of the methodologies or functions described herein. These instructions (e.g., the instructions 1802), when executed by processors 1804, cause various operations to implement the disclosed examples, including the operation of the display system 900.

The instructions 1802 can be transmitted or received over the network 1836, using a transmission medium, via a network interface device (e.g., a network interface component included in the communication components 1834) and using any one of several well-known transfer protocols (e.g., hypertext transfer protocol (HTTP)). Similarly, the instructions 1802 can be transmitted or received using a transmission medium via a coupling (e.g., a peer-to-peer coupling) to the devices 1838.

Software Architecture

Figure 19:
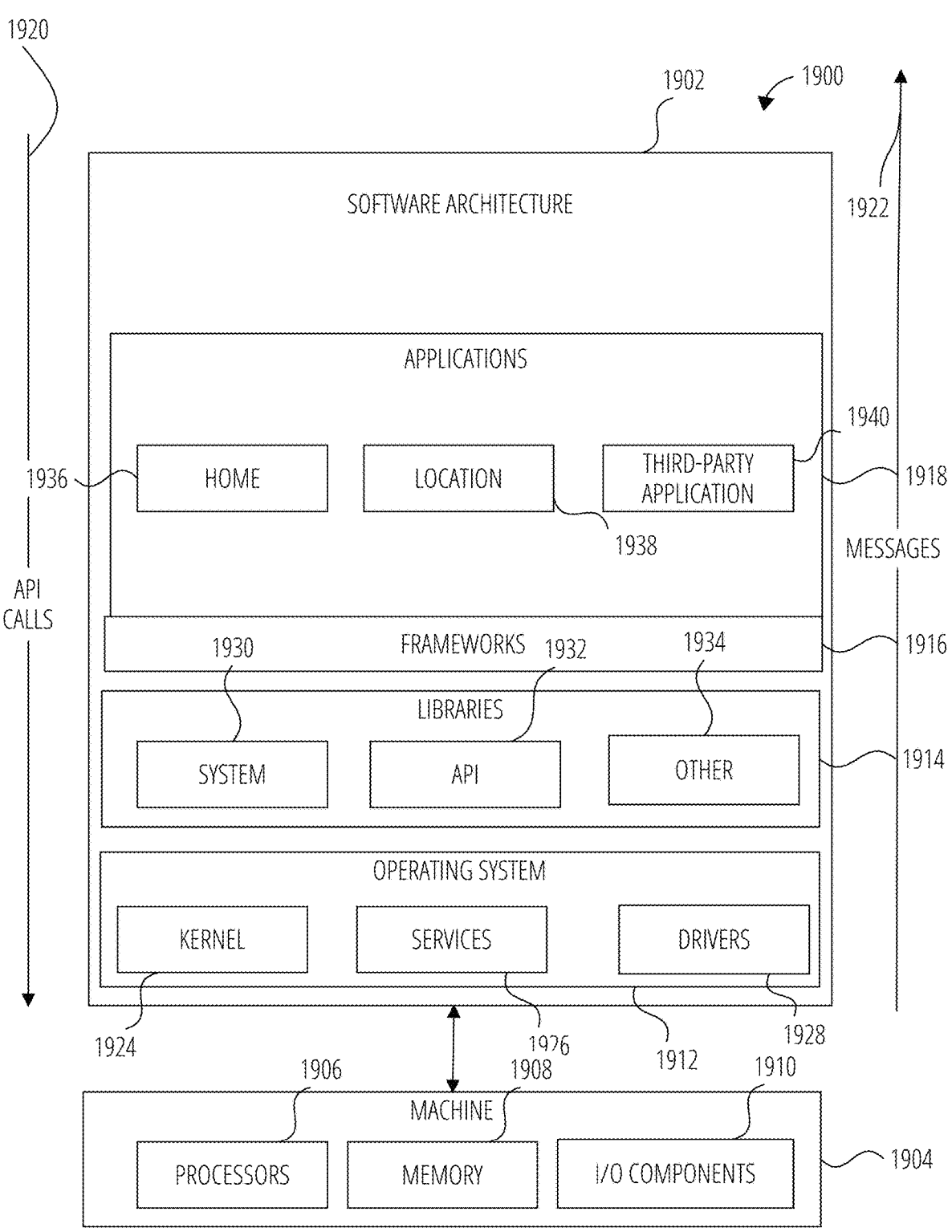
FIG. 19 is a block diagram showing a software architecture within which examples may be implemented, in accordance with some examples.

FIG. 19 is a block diagram 1900 illustrating a software architecture 1902, which can be installed on any one or more of the devices described herein. The software architecture 1902 is supported by hardware such as a machine 1904 that includes processors 1906, memory 1908, and I/O components 1910. In this example, the software architecture 1902 can be conceptualized as a stack of layers, where each layer provides a particular functionality. The software architecture 1902 includes layers such as an operating system 1912, libraries 1914, frameworks 1916, and applications 1918. The applications 1918 can include the 4D scene generation system 104, and/or components thereof, as described herein. Operationally, the applications 1918 invoke API calls 1920 through the software stack and receive messages 1922 in response to the API calls 1920. The described examples, and at least some of the functions thereof, can be implemented by components in one or more layers of the software architecture 1902.

The operating system 1912 manages hardware resources and provides common services. The operating system 1912 includes, for example, a kernel 1924, services 1926, and drivers 1928. The kernel 1924 acts as an abstraction layer between the hardware and the other software layers. For example, the kernel 1924 provides memory management, processor management (e.g., scheduling), component management, networking, and security settings, among other functionalities. The services 1926 can provide other common services for the other software layers. The drivers 1928 are responsible for controlling or interfacing with the underlying hardware. For instance, the drivers 1928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1914 provide a common low-level infrastructure used by the applications 1918. The libraries 1914 can include system libraries 1930 (e.g., C standard library) that provide functions such as memory allocation functions, string manipulation functions, mathematic functions, and the like. In addition, the libraries 1914 can include API libraries 1932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1914 can also include a wide variety of other libraries 1934 to provide many other APIs to the applications 1918.

The frameworks 1916 provide a common high-level infrastructure that is used by the applications 1918. For example, the frameworks 1916 provide various graphical user interface (GUI) functions, high-level resource management, and high-level location services. The frameworks 1916 can provide a broad spectrum of other APIs that can be used by the applications 1918, some of which can be specific to a particular operating system or platform.

In an example, the applications 1918 can include a home application 1936, a location application 1938, and a broad assortment of other applications such as a third-party application 1940. The applications 1918 are programs that execute functions defined in the programs. Various programming languages can be employed to create one or more of the applications 1918, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1920 provided by the operating system 1912 to facilitate functionalities described herein.

Example Statements

Specific examples are now described.

Example 1 is a system comprising: at least one processor; and a memory storing instructions that, when executed by the at least one processor, cause the system to perform operations comprising: obtaining a 4D scene model comprising: a 3D representation of a scene, the scene comprising at least one action paused at a point in time; a plurality of temporal deformations corresponding to transformations of the 3D representation to show the scene at different points in time during the action; and a plurality of point of view (POV) deformations corresponding to transformations of the 3D representation to show different points of view of the scene; the 3D representation, temporal deformations, and per-frame deformations being generated based on a reference video showing the action occurring in the scene; and applying at least one deformation, selected from at least one of the plurality of temporal deformations or the plurality of per-frame deformations, to the 3D representation to generate one or more views of the scene.

In Example 2, the subject matter of Example 1 includes, wherein: obtaining the 4D scene model comprises: obtaining a reference video comprising a first sequence of frames showing the scene comprising at least one action occurring over a time period corresponding to the first sequence of frames; processing the reference video to generate a freeze time video, the freeze time video comprising a second sequence of frames showing the scene of the first sequence of frames from a plurality of points of view, the at least one action of the scene being shown in the second sequence of frames paused at a time corresponding to a frame of the first sequence of frames; processing the freeze time video to generate the 3D representation of the scene; and processing the reference video, the freeze time video, and the 3D representation to generate the plurality of temporal deformations and the plurality of per-frame deformations.

In Example 3, the subject matter of Example 2 includes, wherein: obtaining the reference video comprises generating the reference video based on an input using a diffusion model trained to generate videos.

In Example 4, the subject matter of Example 3 includes, wherein: the input comprises text; and the diffusion model comprises a text-to-video diffusion model.

In Example 5, the subject matter of Examples 3-4 includes, wherein: the input comprises an image; and the diffusion model comprises an image-to-video diffusion model.

In Example 6, the subject matter of Examples 2-5 includes, wherein: the processing of the reference video, the freeze time video, and the 3D representation to generate the plurality of temporal deformations and the plurality of per-frame deformations comprises: learning the plurality of temporal deformations by training the 4D scene model to reconstruct the first sequence of frames based on the 3D representation; and learning the plurality of per-frame deformations by training the 4D scene model to reconstruct the second sequence of frames based on the 3D representation.

In Example 7, the subject matter of Example 6 includes, wherein: the processing of the reference video, the freeze time video, and the 3D representation to generate the plurality of temporal deformations and the plurality of per-frame deformations further comprises: updating the 3D representation while learning the plurality of temporal deformations and the plurality of per-frame deformations.

In Example 8, the subject matter of Examples 6-7 includes, wherein: the processing of the reference video, the freeze time video, and the 3D representation to generate the plurality of temporal deformations and the plurality of per-frame deformations further comprises: generating one or more multi-view SDS videos showing the scene from multiple points of view; generating one or more temporal SDS videos showing the scene at multiple times during the action; adding noise to the one or more multi-view SDS videos and the one or more temporal SDS videos to generate noised videos; for each noised video, processing the noised video using a video diffusion model to generate a corresponding denoised video; generating an SDS loss based on a difference between the noised video and the corresponding denoised video; and further training the 4D scene model using the SDS loss.

In Example 9, the subject matter of Examples 1-8 includes, wherein: the 3D representation comprises a 3D Gaussian splat representation.

In Example 10, the subject matter of Examples 1-9 includes, wherein: the generating of the one or more views of the scene comprises: receiving pose data from an XR device; selecting at least one per-frame deformation based on the pose data; applying the selected at least one per-frame deformation to the 3D representation to generate at least one view of the scene from at least one viewpoint corresponding to the pose data; and displaying the at least one view on the XR device in real-time.

In Example 11, the subject matter of Examples 1-10 includes, wherein: the one or more views of the scene are photorealistic views.

In Example 12, the subject matter of Examples 1-11 includes, wherein: the one or more views of the scene include views of an environment where the action occurs.

Example 13 is a method comprising: obtaining a 4D scene model comprising: a 3D representation of a scene, the scene comprising at least one action paused at a point in time; a plurality of temporal deformations corresponding to transformations of the 3D representation to show the scene at different points in time during the action; and a plurality of point of view (POV) deformations corresponding to transformations of the 3D representation to show different points of view of the scene; the 3D representation, temporal deformations, and per-frame deformations being generated based on a reference video showing the action occurring in the scene; and applying at least one deformation, selected from at least one of the plurality of temporal deformations or the plurality of per-frame deformations, to the 3D representation to generate one or more views of the scene.

In Example 14, the subject matter of Example 13 includes, wherein: obtaining the 4D scene model comprises: obtaining a reference video comprising a first sequence of frames showing the scene comprising at least one action occurring over a time period corresponding to the first sequence of frames; processing the reference video to generate a freeze time video, the freeze time video comprising a second sequence of frames showing the scene of the first sequence of frames from a plurality of points of view, the at least one action of the scene being shown in the second sequence of frames paused at a time corresponding to a frame of the first sequence of frames; processing the freeze time video to generate the 3D representation of the scene; and processing the reference video, the freeze time video, and the 3D representation to generate the plurality of temporal deformations and the plurality of per-frame deformations.

In Example 15, the subject matter of Example 14 includes, wherein: obtaining the reference video comprises generating the reference video based on an input using a transformer model trained to generate videos.

In Example 16, the subject matter of Examples 14-15 includes, wherein: the processing of the reference video, the freeze time video, and the 3D representation to generate the plurality of temporal deformations and the plurality of per-frame deformations comprises: learning the plurality of temporal deformations by training the 4D scene model to reconstruct the first sequence of frames based on the 3D representation; and learning the plurality of per-frame deformations by training the 4D scene model to reconstruct the second sequence of frames based on the 3D representation.

In Example 17, the subject matter of Example 16 includes, wherein: the processing of the reference video, the freeze time video, and the 3D representation to generate the plurality of temporal deformations and the plurality of per-frame deformations further comprises: generating one or more multi-view SDS videos showing the scene from multiple points of view; generating one or more temporal SDS videos showing the scene at multiple times during the action; adding noise to the one or more multi-view SDS videos and the one or more temporal SDS videos to generate noised videos; for each noised video, processing the noised video using a video diffusion model to generate a corresponding denoised video; generating an SDS loss based on a difference between the noised video and the corresponding denoised video; and further training the 4D scene model using the SDS loss.

In Example 18, the subject matter of Examples 13-17 includes, wherein: the 3D representation comprises a 3D Gaussian splat representation.

In Example 19, the subject matter of Examples 13-18 includes, wherein: the generating of the one or more views of the scene comprises: receiving pose data from an XR device; selecting at least one per-frame deformation based on the pose data; applying the selected per-frame deformation to the 3D representation to generate at least one view of the scene from at least one viewpoint corresponding to the pose data; and displaying the at least one view on the XR device in real-time.

Example 20 is a non-transitory computer-readable storage medium, the computer-readable storage medium including instructions that, when executed by at least one processor of a system, cause the system to perform operations comprising: obtaining a 4D scene model comprising: a 3D representation of a scene, the scene comprising at least one action paused at a point in time; a plurality of temporal deformations corresponding to transformations of the 3D representation to show the scene at different points in time during the action; and a plurality of point of view (POV) deformations corresponding to transformations of the 3D representation to show different points of view of the scene; the 3D representation, temporal deformations, and per-frame deformations being generated based on a reference video showing the action occurring in the scene; and applying at least one deformation, selected from at least one of the plurality of temporal deformations or the plurality of per-frame deformations, to the 3D representation to generate one or more views of the scene.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Other technical features may be readily apparent to one skilled in the art from the figures, descriptions, and claims herein.

Term Examples

"2D" refers to, for example, a two-dimensional space, object, or representation, such as an image or a surface.

"3D" refers to, for example, a three-dimensional space, object, or representation, such as a three-dimensional volumetric model or a representation of a scene.

"4D" refers to, for example, a 3D space, object, or representation that changes or moves over time, or that includes a representation of changes of a 3D space or object over time.

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object. XR includes augmented reality (AR) and virtual reality (VR).

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" refers, for example, to a tangible medium that is capable of storing, encoding, or carrying the instructions for execution by a machine.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
at least one processor; and
a memory storing instructions that, when executed by the at least one processor, cause the system to perform operations comprising:
  obtaining a 4D scene model comprising:
    a 3D representation of a scene, the scene comprising at least one action paused at a point in time; and
    a plurality of temporal deformations corresponding to transformations of the 3D representation to show the scene at different points in time during the action;
    the 3D representation and temporal deformations being generated based on a reference video showing the action occurring in the scene; and
  applying a point of view transformation and at least one temporal deformation, selected from the plurality of temporal deformations, to the 3D representation to generate one or more views of the scene.

2. The system of claim 1, wherein:
obtaining the 4D scene model comprises:
  obtaining a reference video comprising a first sequence of frames showing the scene comprising at least one action occurring over a time period corresponding to the first sequence of frames;
  processing the reference video to generate a freeze time video, the freeze time video comprising a second sequence of frames showing the scene of the first sequence of frames from a plurality of points of view, the at least one action of the scene being shown in the second sequence of frames paused at a time corresponding to a frame of the first sequence of frames;
  processing the freeze time video to generate the 3D representation of the scene; and
  processing the reference video and the 3D representation to generate the plurality of temporal deformations.

3. The system of claim 2, wherein:
obtaining the reference video comprises generating the reference video based on an input using a diffusion model trained to generate videos.

4. The system of claim 3, wherein:
the input comprises text; and
the diffusion model comprises a text-to-video diffusion model.

5. The system of claim 3, wherein:
the input comprises an image; and
the diffusion model comprises an image-to-video diffusion model.

6. The system of claim 2, wherein:
the processing of the reference video and the 3D representation to generate the plurality of temporal deformations comprises:
  learning the plurality of temporal deformations by training the 4D scene model to reconstruct the first sequence of frames based on the 3D representation.

7. The system of claim 6, wherein:
the processing of the reference video and the 3D representation to generate the plurality of temporal deformations further comprises:
  learning a plurality of per-frame deformations by training the 4D scene model to reconstruct the second sequence of frames based on the 3D representation; and
  updating the 3D representation while learning the plurality of temporal deformations and the plurality of per-frame deformations.

8. The system of claim 6, wherein:
the processing of the reference video, and the 3D representation to generate the plurality of temporal deformations further comprises:
  generating one or more multi-view SDS videos showing the scene from multiple points of view;
  generating one or more temporal SDS videos showing the scene at multiple times during the action;
  adding noise to the one or more multi-view SDS videos and the one or more temporal SDS videos to generate noised videos;
  for each noised video, processing the noised video using a video diffusion model to generate a corresponding denoised video;
  generating an SDS loss based on a difference between the noised video and the corresponding denoised video; and
  further training the 4D scene model using the SDS loss.

9. The system of claim 1, wherein:
the 3D representation comprises a 3D Gaussian splat representation.

10. The system of claim 1, wherein:
the generating of the one or more views of the scene comprises:
  receiving pose data from an XR device;
  generating a point of view transformation based on the pose data;
  applying the point of view transformation to the 3D representation to generate at least one view of the scene from at least one viewpoint corresponding to the pose data; and
  displaying the at least one view on the XR device in real-time.

11. The system of claim 1, wherein:
the one or more views of the scene are photorealistic views.

12. The system of claim 1, wherein:
the one or more views of the scene include views of an environment where the action occurs.

13. A method comprising:

obtaining a 4D scene model comprising:

a 3D representation of a scene, the scene comprising at least one action paused at a point in time; and a plurality of temporal deformations corresponding to transformations of the 3D representation to show the scene at different points in time during the action;

the 3D representation and temporal deformations being generated based on a reference video showing the action occurring in the scene; and applying a point of view transformation and at least one temporal deformation, selected from the plurality of temporal deformations, to the 3D representation to generate one or more views of the scene.

14. The method of claim 13, wherein:

obtaining the 4D scene model comprises:

obtaining a reference video comprising a first sequence of frames showing the scene comprising at least one action occurring over a time period corresponding to the first sequence of frames;

processing the reference video to generate a freeze time video, the freeze time video comprising a second sequence of frames showing the scene of the first sequence of frames from a plurality of points of view, the at least one action of the scene being shown in the second sequence of frames paused at a time corresponding to a frame of the first sequence of frames;

processing the freeze time video to generate the 3D representation of the scene; and processing the reference video and the 3D representation to generate the plurality of temporal deformations.

15. The method of claim 14, wherein:

obtaining the reference video comprises generating the reference video based on an input using a transformer model trained to generate videos.

16. The method of claim 14, wherein:

the processing of the reference video and the 3D representation to generate the plurality of temporal deformations comprises:

learning the plurality of temporal deformations by training the 4D scene model to reconstruct the first sequence of frames based on the 3D representation.

17. The method of claim 16, wherein:

the processing of the reference video and the 3D representation to generate the plurality of temporal deformations further comprises:

generating one or more multi-view SDS videos showing the scene from multiple points of view;

generating one or more temporal SDS videos showing the scene at multiple times during the action;

adding noise to the one or more multi-view SDS videos and the one or more temporal SDS videos to generate noised videos;

for each noised video, processing the noised video using a video diffusion model to generate a corresponding denoised video;

generating an SDS loss based on a difference between the noised video and the corresponding denoised video; and further training the 4D scene model using the SDS loss.

18. The method of claim 13, wherein:

the 3D representation comprises a 3D Gaussian splat representation.

19. The method of claim 13, wherein:

the generating of the one or more views of the scene comprises:

receiving pose data from an XR device;

generating a point of view transformation based on the pose data;

applying the point of view transformation to the 3D representation to generate at least one view of the scene from at least one viewpoint corresponding to the pose data; and displaying the at least one view on the XR device in real-time.

20. A non-transitory computer-readable storage medium, the computer-readable storage medium including instructions that, when executed by at least one processor of a system, cause the system to perform operations comprising:

obtaining a 4D scene model comprising:

a 3D representation of a scene, the scene comprising at least one action paused at a point in time; and a plurality of temporal deformations corresponding to transformations of the 3D representation to show the scene at different points in time during the action; the 3D representation and temporal deformations being generated based on a reference video showing the action occurring in the scene; and applying a point of view transformation and at least one temporal deformation, selected from the plurality of temporal deformations, to the 3D representation to generate one or more views of the scene.

* * * * *